US010453071B2

(12) United States Patent
Gabriel et al.

(10) Patent No.: US 10,453,071 B2
(45) Date of Patent: Oct. 22, 2019

(54) INTERACTIVE CASE MANAGEMENT SYSTEM

(71) Applicant: UnitedLex Corp., Overland Park, KS (US)

(72) Inventors: John Thomas Gabriel, Overland Park, KS (US); Baroon Anand, New Delhi (IN); Christopher David Deppe, Stilwell, KS (US); Thomas P. Seymour, Fairway, KS (US); Gerardo Herrera, Raymore, MO (US); Ashish Upadhyay, Overland Park, KS (US); Ryan Reeves, Kansas City, MO (US)

(73) Assignee: UNITEDLEX CORP., Overland Park, KS (US)

( * ) Notice: Subject to any disclaimer, the term of this patent is extended or adjusted under 35 U.S.C. 154(b) by 916 days.

(21) Appl. No.: 14/480,901

(22) Filed: Sep. 9, 2014

(65) Prior Publication Data
US 2015/0074007 A1 Mar. 12, 2015

Related U.S. Application Data

(60) Provisional application No. 61/875,474, filed on Sep. 9, 2013.

(51) Int. Cl.
*G06Q 30/00* (2012.01)
*G06Q 10/00* (2012.01)
(Continued)

(52) U.S. Cl.
CPC ............. *G06Q 30/00* (2013.01); *G06F 16/93* (2019.01); *G06Q 10/00* (2013.01); *G06Q 10/10* (2013.01); *G06Q 50/18* (2013.01)

(58) Field of Classification Search
CPC ... G06F 17/30011; G06F 16/93; G06Q 30/00; G06Q 10/00; G06Q 10/10; G06Q 50/18
See application file for complete search history.

(56) References Cited

U.S. PATENT DOCUMENTS 5,555,191 A * 9/1996 Hripcsak ............... G06F 11/327
340/501
7,630,381 B1 * 12/2009 Roskind .................... G06F 8/65
370/395.42
(Continued)

FOREIGN PATENT DOCUMENTS

CN  101826170  9/2010
CN  103229167  7/2013
(Continued)

OTHER PUBLICATIONS

International Search Report issued in International Application No. PCT/US2014/054657 dated Dec. 30, 2014.
(Continued)

Primary Examiner — James Trujillo
Assistant Examiner — Hubert Cheung
(74) Attorney, Agent, or Firm — DLA Piper LLP US

(57) ABSTRACT

Embodiments of the present disclosure are directed to a method for processing computer readable electronic files in an investigation in a computer system including a processor coupled to a display and an electronic storage device coupled to the processor. The method includes the processor accessing the electronic files and related data from a data source. The accessed files and related data are culled by the processor based on predetermined filter criteria. The processor stores the remaining files and related data in a third-party data repository and maps a set of electronic files and related data stored in the third-party data repository into a predetermined database schema. The mapped files and related data are analyzed by the processor, which applies a
(Continued)

status decision on them. The analyzed electronic files and related data are submitted to a third-party e-discovery processing application based on the applied status decision.

28 Claims, 20 Drawing Sheets

(51) Int. Cl.
*G06F 16/93* (2019.01)
*G06Q 10/10* (2012.01)
*G06Q 50/18* (2012.01)

(56) References Cited

U.S. PATENT DOCUMENTS

| | | |
|---|---|---|
| 7,792,789 B2 | 9/2010 | Prahlad et al. |
| 7,882,077 B2 | 2/2011 | Gokhale et al. |
| 8,037,031 B2 | 10/2011 | Gokhale et al. |
| 8,140,786 B2 | 3/2012 | Bunte et al. |
| 8,200,635 B2 | 6/2012 | Mayer et al. |
| 8,224,924 B2 | 7/2012 | Andersen et al. |
| 8,234,344 B2 | 7/2012 | Mobbs et al. |
| 8,250,037 B2 | 8/2012 | Andersen et al. |
| 8,271,597 B2 | 9/2012 | Rashad et al. |
| 8,321,860 B2 | 11/2012 | Andersen et al. |
| 8,364,681 B2 | 1/2013 | Richards et al. |
| 8,396,838 B2 | 3/2013 | Brockway et al. |
| 8,504,489 B2 | 8/2013 | Richards et al. |
| 8,417,716 B2 | 9/2013 | Andersen et al. |
| 8,549,327 B2 | 10/2013 | Mayer et al. |
| 8,572,227 B2 | 10/2013 | Toomey et al. |
| 8,572,376 B2 | 10/2013 | Andersen et al. |
| 8,620,942 B1 | 12/2013 | Hoffman et al. |
| 8,635,207 B2 | 1/2014 | Marlin |
| 8,688,648 B2 | 4/2014 | Andersen et al. |
| 8,700,756 B2 | 4/2014 | Chidlovskii |
| 8,805,832 B2 | 8/2014 | Mayer et al. |
| 8,806,358 B2 | 8/2014 | Mayer et al. |
| 2003/0177118 A1* | 9/2003 | Moon ............. G06F 17/30707 |
| 2004/0153467 A1* | 8/2004 | Conover .......... G06F 17/30707 |
| 2005/0188022 A1* | 8/2005 | Hanson ............... G06Q 30/00 709/206 |
| 2005/0209876 A1* | 9/2005 | Kennis ............. G06F 17/30569 726/1 |
| 2006/0173824 A1 | 8/2006 | Bensky et al. |
| 2006/0212486 A1* | 9/2006 | Kennis ............. G06F 17/30569 |
| 2006/0248080 A1* | 11/2006 | Gray ................ G06F 17/30457 |
| 2006/0277258 A1 | 12/2006 | Goldfarb |
| 2007/0109608 A1 | 5/2007 | Lunt et al. |
| 2007/0136808 A1* | 6/2007 | Xiong ................. G06F 21/566 726/22 |
| 2007/0226802 A1* | 9/2007 | Gopalan .............. G06F 21/564 726/24 |
| 2008/0091655 A1 | 4/2008 | Gokhale et al. |
| 2008/0222108 A1 | 9/2008 | Prahlad et al. |
| 2008/0229037 A1 | 9/2008 | Bunte et al. |
| 2010/0107156 A1 | 4/2010 | Andersen et al. |
| 2010/0185875 A1 | 7/2010 | Mayer et al. |
| 2010/0250266 A1 | 9/2010 | Miller et al. |
| 2010/0250308 A1 | 9/2010 | Mayer et al. |
| 2010/0250455 A1 | 9/2010 | Richards et al. |
| 2010/0250456 A1 | 9/2010 | Toomey et al. |
| 2010/0250459 A1 | 9/2010 | Andersen et al. |
| 2010/0250474 A1 | 9/2010 | Richards et al. |
| 2010/0250484 A1 | 9/2010 | Andersen et al. |
| 2010/0250488 A1 | 9/2010 | Mayer et al. |
| 2010/0250498 A1 | 9/2010 | Andersen et al. |
| 2010/0250503 A1 | 9/2010 | Andersen et al. |
| 2010/0250509 A1* | 9/2010 | Andersen ............. G06Q 10/10 707/705 |
| 2010/0250512 A1 | 9/2010 | Miller et al. |
| 2010/0250531 A1* | 9/2010 | Andersen .......... G06F 17/30997 707/736 |
| 2010/0250538 A1 | 9/2010 | Richards et al. |
| 2010/0250541 A1* | 9/2010 | Richards ............. G06Q 30/02 707/737 |
| 2010/0250573 A1 | 9/2010 | Mayer et al. |
| 2010/0250624 A1 | 9/2010 | Mayer et al. |
| 2010/0250644 A1* | 9/2010 | Toomey .............. G06Q 10/06 709/202 |
| 2010/0250735 A1 | 9/2010 | Andersen et al. |
| 2010/0250931 A1 | 9/2010 | Andersen et al. |
| 2010/0251149 A1 | 9/2010 | Mayer et al. |
| 2011/0131225 A1 | 2/2011 | Mayer et al. |
| 2011/0093470 A1 | 4/2011 | Gokhale et al. |
| 2011/0093471 A1* | 4/2011 | Brockway ......... G06F 17/30616 707/747 |
| 2011/0184935 A1* | 7/2011 | Marlin ................ G06Q 50/10 707/719 |
| 2012/0278761 A1* | 11/2012 | John .................. G06Q 10/107 715/810 |
| 2012/0290672 A1 | 11/2012 | Robinson et al. |
| 2012/0324370 A1 | 12/2012 | Martin |
| 2013/0036138 A1* | 2/2013 | Bellows .............. G06Q 10/107 707/772 |
| 2013/0124545 A1* | 5/2013 | Holmberg ......... G06F 17/30244 707/756 |
| 2013/0124548 A1 | 5/2013 | Chhaparia et al. |
| 2013/0135314 A1 | 5/2013 | Haggerty et al. |
| 2013/0212118 A1 | 8/2013 | King et al. |
| 2014/0222756 A1* | 8/2014 | Schmidt ........... G06F 17/30303 707/610 |
| 2015/0339298 A1* | 11/2015 | Morimoto ............ G06Q 50/18 707/730 |

FOREIGN PATENT DOCUMENTS

| | | |
|---|---|---|
| JP | 2004-046680 | 2/2004 |
| JP | 2004-326772 | 11/2004 |
| JP | 2006-522395 | 9/2005 |
| JP | 2006-079257 | 3/2006 |
| JP | 2010-107832 | 5/2010 |
| JP | 2012-032859 | 2/2012 |

OTHER PUBLICATIONS

Written Opinion issued in International Application No. PCT/US2014/054657 dated Dec. 30, 2014.
International Preliminary Report on Patentability (IPRP) issued in International Application No. PCT/US2014/054657 dated Mar. 15, 2016.
Anonymous: "Partitioned Tables and Indexes", https://web.archive.org/web/20130713120951/https://docs.oracle.com/cd/B10500_01/server.920/a96524/c12parti.htm retrieved on May 23, 2017.
Extended European Search Report issued in EP 14842582.0 dated Jun. 1, 2017.
Chinese Office Action issued CN 201400861400.1 dated Feb. 1, 2018.
Japanese Office Action issued in JP 2016-540918 dated May 15, 2018.
European Examination Report issued in EP 14 842 582.0 dated Aug. 6, 2018.

* cited by examiner

SEARCH RESULTS SUMMARY

RESULTS FOR: COMMON TERMS

LAST RAN ON: 2013-11-15 09:33

RESULTS BY TEAM

| TERM | TOTAL HITS | DOCS | SIZE | UNIQUE DOCS | UNIQUE SIZE | DOCS W/FAMILIES | FAMILY SIZE |
|---|---|---|---|---|---|---|---|
| TIME | 376,472 | 68,199 | 17.082 | 35,181 | 6.186 | 107,518 | 29.434 |
| MANAGE | 23,226 | 11,908 | 4.268 | 1,139 | 0.090 | 29,906 | 11.154 |
| DISCUSS | 29,846 | 19,216 | 4.596 | 7,221 | 1.739 | 38,392 | 9.735 |
| METHOD | 44,969 | 9,653 | 4.363 | 2,531 | 0.048 | 19,985 | 10.860 |
| MONITOR | 18,216 | 6,842 | 2.798 | 1,001 | 0.280 | 17,457 | 6.618 |
| FAMILY | 17,132 | 4,868 | 2.054 | 1,263 | 0.090 | 10,007 | 3.426 |
| INHERENT | 3,722 | 2,693 | 1.256 | 102 | 0.004 | 7,941 | 4.213 |
| RISK | 127,719 | 30,694 | 10.097 | 8,189 | 2.266 | 60,112 | 22.548 |
| 8 | 641,302 | 93,286 | 22.207 | 56,627 | 10.705 | 135,222 | 34.383 |

ALL SIZES ARE IN GIGABYTES
ALL TOTALS REPRESENT UNIQUE DOCUMENTS

RESULTS BY CUSTODIAN

| CUSTODIAN/TERM | TOTAL HITS | DOCS | SIZE | UNIQUE DOCS | UNIQUE SIZE | DOCS W/FAMILIES | FAMILY SIZE |
|---|---|---|---|---|---|---|---|
| JAMES DERRICK | 3,300 | 815 | 0.084 | 547 | 0.041 | 1,171 | 0.150 |
| JEFF SKILLING | 48,797 | 7,621 | 2.001 | 5,470 | 0.735 | 12,551 | 2.839 |
| KENNETH LAY | 41,173 | 6,172 | 1.046 | 4,450 | 0.339 | 7,708 | 1.217 |
| STEVEN KEAN | 548,032 | 78,678 | 19.076 | 46,160 | 9.590 | 113,792 | 30.177 |
| 4 | 641,302 | 93,286 | 22.207 | 56,627 | 10.705 | 135,222 | 34.383 |

ALL SIZES ARE IN GIGABYTES
ALL TOTALS REPRESENT UNIQUE DOCUMENTS

FIG. 7

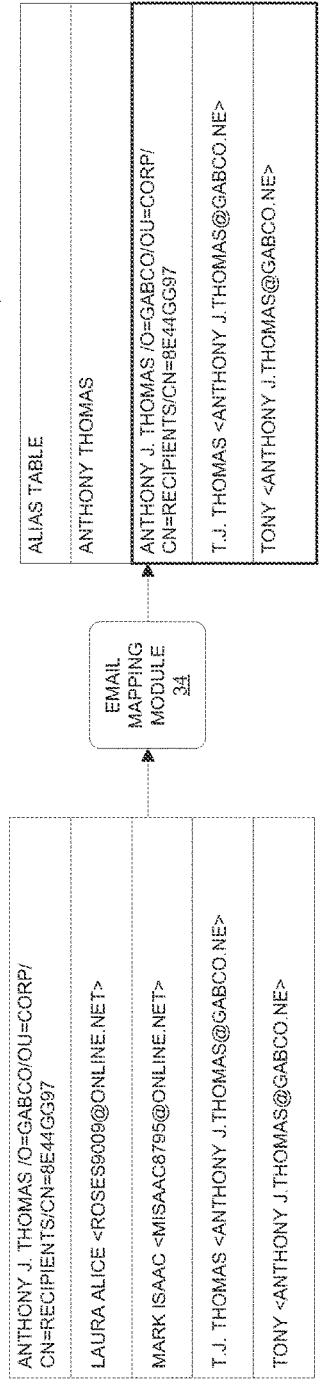
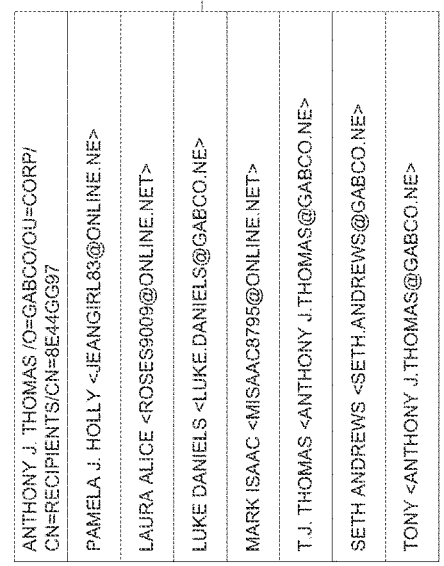
FIG. 8B
FIG. 8C

METADATA TABLE — 230

| MD_ID | MD5 | FILE TYPE | SUBJECT |
|---|---|---|---|
| 1 | 244BF6739CE21D7B857704F693638E9D | EXCEL SPREADSHEET | |
| 2 | 7D74D5169A0A5435EF6695D085896D00 | OUTLOOK EMAIL | ANNUAL SHAREHOLDER REPORT |

EXTRACTED TEXT TABLE — 232

| MD_ID | BODY CONTENT |
|---|---|
| 1 | ANNUAL FINANCIAL REPORT   THIS DOCUMENT... |
| 2 | DEAR SHAREHOLDERS, PLEASE FIND ATTACHED... |

INVENTORY TABLE — 234

| I_ID | NAME | SIZE | MD5 | MD_ID |
|---|---|---|---|---|
| 1 | ANNUAL FINANCIAL REPORT.XLSX | 48,245 | 244BF6739CE21D7B857704F693638E9D | 1 |
| 2 | ANNUAL SHAREHOLDER'S REPORT.MSG | 52,876 | 7D74D5169A0A5435EF6695D085896D00 | 2 |
| 3 | ANNUAL FINANCIAL REPORT.XLSX | 48,245 | 244BF6739CE21D7B857704F693638E9D | 1 |

INTERACTIVE CASE MANAGEMENT SYSTEM

CROSS REFERENCE TO RELATED APPLICATION

This application is based on and derives the benefit of the filing date of U.S. Provisional Patent Application No. 61/875,474, filed Sep. 9, 2013, the contents of which are incorporated herein by reference in their entirety.

TECHNICAL FIELD

The presently disclosed subject matter generally relates to methods, systems, and apparatuses for data management, and more particularly to an interactive case management system.

BACKGROUND

Many situations call for the analysis of a body of electronically stored documents. One example is in electronic discovery. Electronic discovery (or e-discovery) may be referred to as the electronic aspect of identifying, collecting, and/or producing electronically stored information (ESI) performed in a manner that adheres to the established standards of evidence for the information to become admissible as legal evidence in a court of law. ESI may include, but is not limited to, emails, documents, presentations, databases, voicemails, audio and video files, social media, and web sites.

In the context of the discovery phase of litigation, an individual or organization (target party) may need to gather documents, such as documents in its possession, for submission to another party, such as an opposing party, in response to the opposing party's requests for production of documents (production requests). The production requests of the requesting party may cite categories of documents or types of information. Thus, the target party will evaluate its documents, such as documents in its possession, for those documents which are relevant to the cited categories of documents or types of information (relevant documents). Once gathered, the target party may further evaluate the relevant documents prior to production to the requesting party for various reasons, such as for the purpose of culling or segregating documents that may be subject to the attorney client privilege or attorney work product doctrine (privileged information). Once the documents are produced to the opposing party, the opposing party needs to analyze the documents.

SUMMARY

One exemplary embodiment may include a system and a method for assessing time-based anomalies in data represented by electronic computer readable files in a computer system including at least one processor and at least one electronic storage device coupled to the at least one processor. The method may include the at least one processor identifying all electronic files stored in the at least one electronic storage device obtained from one or more specified custodians of electronic files. The method may also include the at least one processor determining a date associated with each of the identified electronic files. The method may further include the at least one processor determining a number of electronic files associated with the specified custodians in each of a series of time segments over a period of time. Furthermore, the method may include the at least one processor causing at least one display coupled to the at least one processor to display the number of electronic files in each of the series of time segments. The method may also include the at least one processor causing the at least one display to illustrate those time segments with large and/or small numbers compared to other time segments.

Another exemplary embodiment may include a system and a method for processing computer readable electronic files in an investigation in a computer system including at least one processor, at least one electronic storage device coupled to the at least one processor and at least one display coupled to the at least one processor. The method may include the at least one processor accessing the electronic files and data related to the electronic files from a data source. The method may also include the at least one processor culling at least one of the accessed files and related data based on predetermined filter criteria. The method may further include the at least one processor storing the remaining files and related data in a third-party data repository. Furthermore, the method may include the at least one processor mapping a set of electronic files and related data stored in the third-party data repository into a predetermined database schema. The method may also include the at least one processor analyzing the mapped files and related data. The method may further include the at least one processor applying a status decision on the analyzed files and related data. The method may additionally include the at least one processor submitting at least one analyzed electronic file and related data to a third-party e-discovery processing application based on the applied status decision.

Other and further aspects and features of the disclosure will be evident from reading the following detailed description of the embodiments, which are intended to illustrate, not limit, the present disclosure.

BRIEF DESCRIPTION OF THE DRAWINGS

The accompanying drawings, which are incorporated here and constitute a part of this specification, illustrate exemplary embodiments of the present disclosure and, together with the description, serve to explain the principles of the disclosure.

FIG. 7 is a schematic that illustrates an exemplary search report generated using the interactive case management system of FIG. 1A, according to an embodiment of the present disclosure;

FIGS. 8A, 8B, and 8C illustrate exemplary alias tables generated using the interactive case management system of FIG. 1A, according to an embodiment of the present disclosure;

FIG. 14 illustrates an exemplary metadata table, an extracted content table, and an inventory table generated using the interactive case management system of FIG. 1A, according to an embodiment of the present disclosure;

FIGS. 16 and 17 illustrate exemplary interface screens for the interactive case management system of FIG. 1A, according to an embodiment of the present disclosure.

DETAILED DESCRIPTION

Figure 1A:
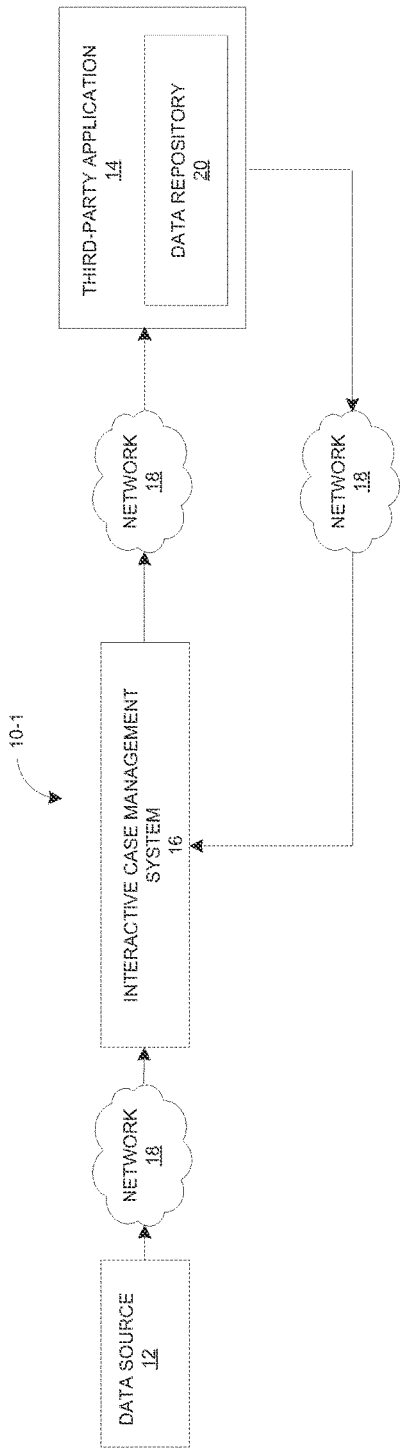
FIG. 1A is a schematic that illustrates a first network environment including an exemplary interactive case management system, according to an embodiment of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

In various embodiments of the present disclosure, definitions of one or more terms that will be used in the document are provided below.

A "File" is used in the present disclosure in the context of its broadest definition. The file may refer to a computer readable, electronic file and related data in a variety of formats supporting storage, printing, or transfer of the file and related data over a communication channel. The file may be capable of being editable or non-editable, encrypted or decrypted, coded or decoded, compressed or decompressed, and convertible or non-convertible into different file formats and storage schemas. The file may be capable of being used by software applications to execute predetermined tasks.

A "Document" is used in the present disclosure in the context of its broadest definition. The document may refer to an electronic document including a single page or multiple pages. Each page may have text, images, embedded audios, embedded videos, embedded data files, or any combination thereof. The document may be a type of file.

A "Data Source" is used in the present disclosure in the context of its broadest definition. The data source may refer to a networked computing device, a computer readable medium, or a portable storage device configured to at least one of (1) store, manage, or process data or files, (2) establish a communication channel or environment, and (3) request services from or deliver services to, or both, other devices connected to a network.

A "Custodian" is used in the present disclosure in the context of its broadest definition. The custodian may refer to an entity, e.g., a human, a storage device, an artificial intelligence (AI) system, etc., responsible for, or having administrative control over, granting access to files or data while protecting the data as defined by a security policy or standard information technology (IT) practices in an e-discovery workflow.

A "Case" is used in the present disclosure in the context of its broadest definition. The case may refer to a named collection of files and related data associated with a particular custodian or a group of custodians. The case may pertain to a legal matter in the e-discovery workflow.

An "Index" is used in the present disclosure in the context of its broadest definition. The index may refer to a collection of one or more named references to files and related data stored in a database.

A "Search Term" is used in the present disclosure in the context of its broadest definition. The search term may refer to one or more strings of characters and/or numbers that may include Boolean logic operators or any other operator corresponding to or compatible with one or more computer programming languages. The search term may be a lowest level indicating minimum information reported for obtaining a search result.

A "User" is used in the present disclosure in the context of its broadest definition. The user may refer to an AI system or a person assigned access to and privilege within a computing device or system.

A "Filter Facet" is used in the present disclosure in the context of its broadest definition. The filter facet may refer to a category (e.g., dates, file types, etc.) that may be applied to review only a subset of the files and/or related data from a collection case documents.

A "Role" is used in the present disclosure in the context of its broadest definition. The role may refer to a grouping of permissions assigned to the user.

The numerous references in the disclosure to an interactive case management system are intended to cover any and/or all devices capable of performing respective operations on data in the ESI workflow relevant to the applicable context, regardless of whether or not the same are specifically provided.

Exemplary Embodiments

FIG. 1A is a schematic that illustrates a first network environment including an exemplary interactive case management system, according to an embodiment of the present disclosure. The first network environment 10-1 may include a data source 12 communicating with a third-party ESI, e.g., e-discovery, processing application 14 via an interactive case management system 16 over a network 18. The network 18 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 18 may include multiple networks or sub-networks, each of which may include, for example, a wired or wireless data pathway. The network 18 may include a circuit-switched voice network, a packet-switched data network, or any other network able to carry electronic communications. For example, the network 18 may include networks based on the Internet protocol (IP) or asynchronous transfer mode (ATM), and may support voice using, for example, VoIP, Voice-over-ATM, or other comparable protocols used for voice, video, and data communications.

The data source 12 may be implemented as any of a variety of computing devices (e.g., a desktop PC, a personal digital assistant (PDA), a server, a mainframe computer, a mobile computing device (e.g., mobile phones, laptops, etc.), an internet appliance, etc.), or a computer readable medium such as a smartcard, or a portable storage device (e.g., a USB drive, an external hard drive, etc.), and so on. The server may be implemented as any of a variety of computing devices including, for example, a general purpose computing device, multiple networked servers (arranged in clusters or as a server farm), a mainframe, or so forth.

The third-party ESI processing application 14 (hereinafter referred to as third-party application 14) may include a data repository 20, which may include or sub-divided into various databases for storing electronic files. The data repository 20 may have one of many database schemas known in the art, related art, or developed later for storing data corresponding to the files from the data source 12 via the interactive case management system 16. For example, the data repository 20 may have a relational database schema involving a primary key attribute and one or more secondary attributes. The third-party application 14 may perform one or more operations such as reading, writing, indexing, updating, etc. on the data, and may communicate with various networked computing devices.

The interactive case management system 16 may be configured to at least one of: (1) communicate simultaneously with one or more third-party applications such as the third-party application 14, databases such as the data repository 20, or appliances operating using same or different communication protocols, formats, and database schemas, or any combination thereof; (2) index, filter, manipulate, and analyze data based on at least one predefined or dynamically created criterion; (3) transfer, receive, or map data for communication with one or more networked computing devices and data repositories; (4) associate data based on one or more attributes to create data sets; (5) generate customizable visual representations of data or data sets; (6) graphically represent data, data sets, or generated visual representations over a customizable timeline for predetermined one or more custodians, and/or group of custodians; (7) generate indications for a user and responding to indications from the user regarding the current status or state of files or data; (8) search, identify, extract, map, and use metadata associated with the files; and (9) store files and related data including metadata in a non-redundant manner.

The interactive case management system 16 may represent any of a wide variety of devices capable of providing case management services for the network devices. The interactive case management system 16 may be implemented as a standalone and dedicated "black box" including hardware and installed software, where the hardware is closely matched to the requirements and/or functionality of the software. Alternatively, the interactive case management system 16 may be implemented as a software application or a device driver. The interactive case management system 16 may enhance or increase the functionality and/or capacity of the network, such as the network 18, to which it is connected. In some embodiments, the interactive case management system 16 may be configured, for example, to perform e-mail tasks, security tasks, network management tasks including IP address management, and other tasks. In some other embodiments, the interactive case management system 16 may be configured to expose its computing environment or operating code to a user, and may include related art I/O devices, such as a keyboard or display. The interactive case management system 16 of some embodiments may, however, include software, firmware, or other resources that support remote administration and/or maintenance of the interactive case management system 16.

Figure 1B:
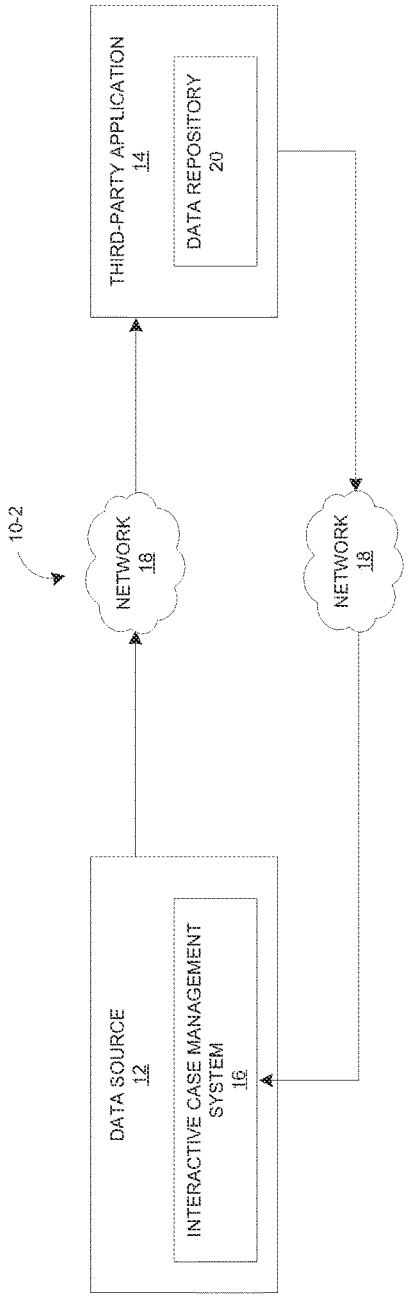
FIG. 1B is a schematic that illustrates a second network environment including the interactive case management system of FIG. 1A, according to an embodiment of the present disclosure.
Figure 1C:
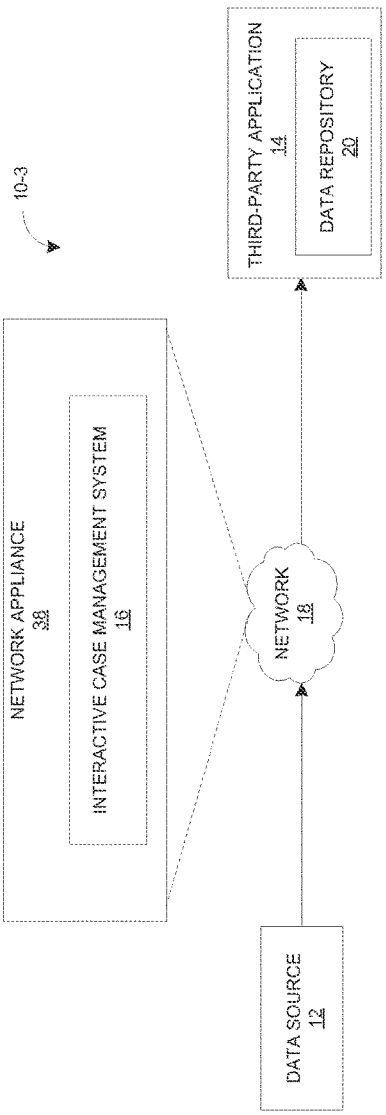
FIG. 1C is a schematic that illustrates a third network environment including the interactive case management system of FIG. 1A, according to an embodiment of the present disclosure.
Figure 1D:
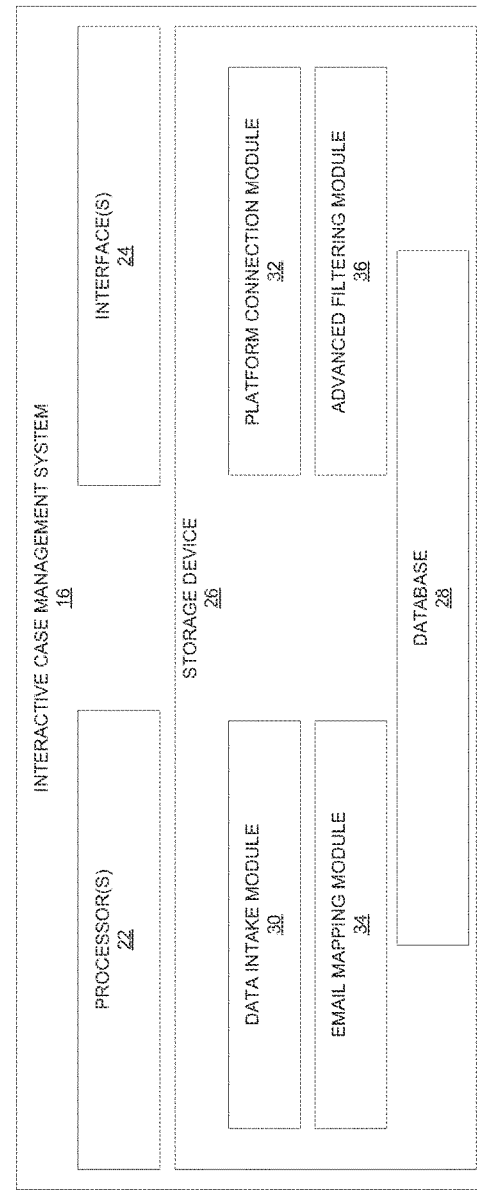
FIG. 1D is a schematic representation of the components of the exemplary interactive case management system of FIG. 1A, according to an embodiment of the present disclosure.

As illustrated in FIG. 1D, the interactive case management system 16 may be implemented by way of a single device (e.g., a computing device, processor or an electronic storage device) or a combination of multiple devices. The interactive case management system 16 may be implemented in hardware or a suitable combination of hardware and software. In some embodiments, the interactive case management system 16 may be a hardware device including processor(s) 22 executing machine readable program instructions for analyzing data, and interactions between the data source 12 and the data repository 20. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) 22 may include, for example, microprocessors, microcomputers, microcontrollers, digital signal processors, central processing units, state machines, logic circuits, and/or any devices that manipulate signals based on operational instructions. Among other capabilities, the processor(s) 22 may be configured to fetch and execute computer readable instructions in a memory associated with the interactive case management system 16.

The interactive case management system 16 may manage interactions between the data source 12 and the third-party application 14 over the network 18. These interactions may include queries, instructions or data from the third-party application 14 to the data source 12 and/or the interactive case management system 16, and vice versa. The interactive case management system 16 may include a variety of known, related art, or later developed interface(s) 24, including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

The interactive case management system 16 may further include an electronic storage device 26 for storing at least one of (1) a copy of files and related data including metadata; and (2) a log of profiles of network devices and associated communications including instructions, queries, data, and related metadata. The storage device 26 may comprise of any computer-readable medium known in the art, related art, or developed later including, for example, volatile memory (e.g., RAM), non-volatile memory (e.g., flash, etc.), disk drive, etc., or any combination thereof. In one embodiment, the storage device 26 may include a database 28 having a predetermined schema and various modules such as a data intake module 30, a platform connection module 32, an email mapping module 34, and an advanced filtering module 36. The predetermined schema and these modules are discussed below in detail.

In some embodiments, the interactive case management system 16 may include, in whole or in part, a software application working alone or in conjunction with one or more hardware resources. Such software applications may be executed by the processor(s) 22 on different hardware platforms or emulated in a virtual environment. Aspects of the interactive case management system 16 may leverage known, related art, or later developed off-the-shelf software.

Other embodiments may comprise the interactive case management system 16 being integrated or in communication with a mobile switching center, network gateway system, Internet access node, application server, IMS core, service node, or some other communication systems, including any combination thereof. In some embodiments, the interactive case management system 16 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

In further embodiments, the interactive case management system 16 either in communication with the data source 12, or independently, may have video, voice, and data communication capabilities (e.g., a unified communication capabilities) by being coupled to or including, various imaging devices (e.g., cameras, printers, scanners, medical imaging systems, etc.), various audio devices (e.g., microphones, audio input devices, speakers, audio output devices, telephones, speaker telephones, etc.), various video devices (e.g., monitors, projectors, displays, televisions, video output devices, video input devices, cameras, etc.), or any other type of hardware, in any combination thereof. In some embodiments, the interactive case management system 16 may comprise or implement one or more real time protocols (e.g., session initiation protocol (SIP), H.261, H.263, H.264, H.323, etc.) and non-real time protocols known in the art, related art, or developed later to facilitate data transfer among the data source 12, the third-party application 14, and any other network device.

In some embodiments, the interactive case management system 16 may be configured to convert communications, which may include instructions, queries, data, etc., from the data source 12 into appropriate formats to make these communications compatible with the third-party data application 14, and vice versa. Consequently, the interactive case management system 16 may allow implementation of the data repository 20 using different technologies or by different organizations, e.g., a third-party vendor, managing the data repository 20 using a proprietary technology.

In another embodiment (FIG. 1B), the interactive case management system 16 may be integrated with, or installed on, the data source 12. In yet another embodiment (FIG. 1C), the interactive case management system 16 may be installed on or integrated with any network appliance 38 configured to establish the network 18 between the data source 12 and the data repository 20. At least one of the interactive case management system 16 and the network appliance 38 may be capable of operating as or providing an interface to assist exchange of software instructions and data among the data source 12, the data repository 20, and the interactive case management system 16. In some embodiments, the network appliance 38 may be preconfigured or dynamically configured to include the interactive case management system 16 integrated with other devices. For example, the interactive case management system 16 may be integrated with the data source 12 (as shown in FIG. 1B), third-party application 14 or any other user device (not shown) connected to the network 18. The data source 12 may include a module (not shown), which enables that data source 12 being introduced to the network appliance 38, thereby enabling the network appliance 38 to invoke the interactive case management system 16 as a service. Examples of the network appliance 38 may include, but are not limited to, a DSL modem, a wireless access point, a router, a base station, and a gateway having a predetermined computing power sufficient for implementing the interactive case management system 16.

Figure 2:
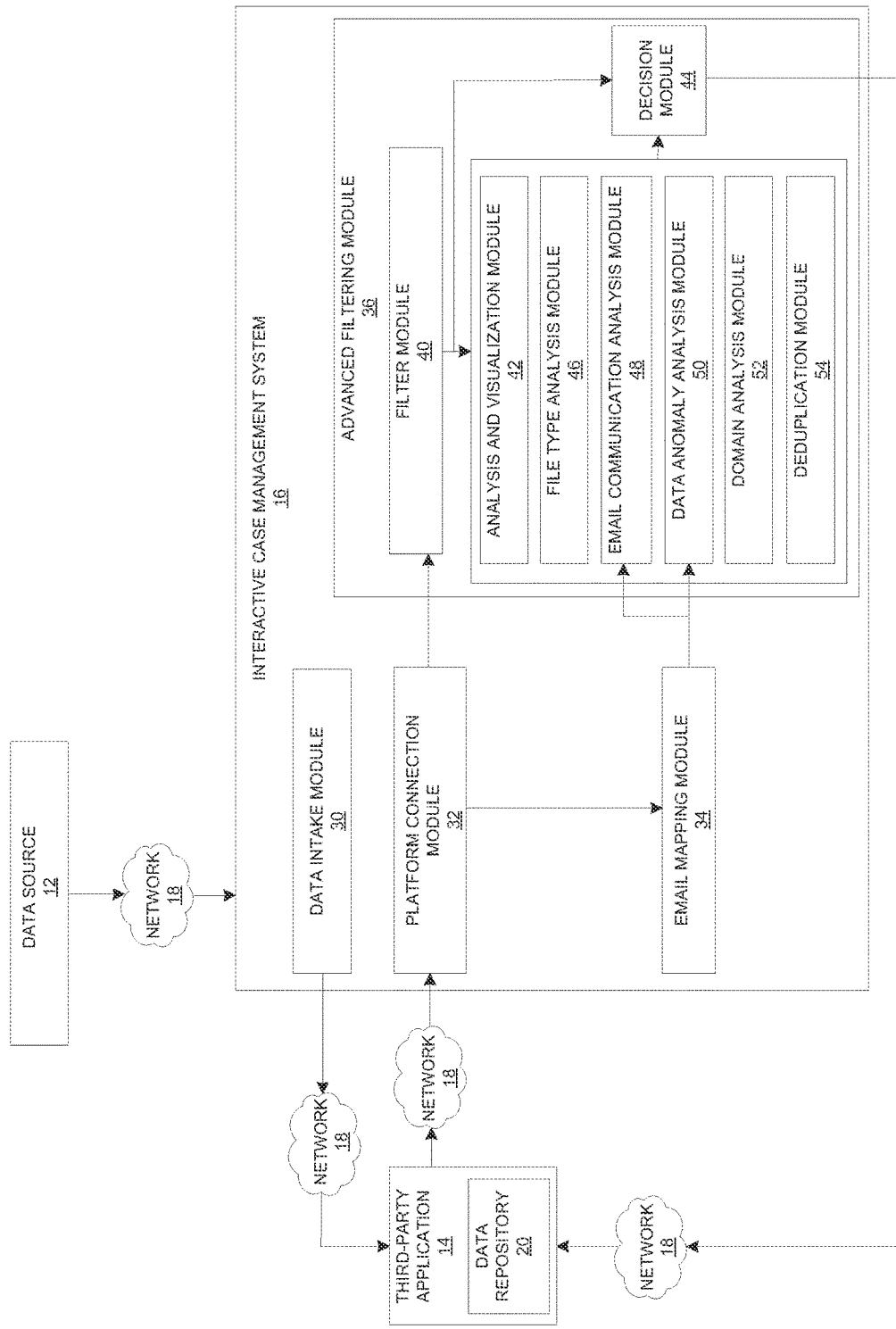
FIG. 2 is a schematic that illustrates the exemplary interactive case management system of FIG. 1A in communication with network components, according to an embodiment of the present disclosure.

FIG. 2 is a schematic that illustrates the exemplary interactive case management system of FIG. 1A in communication with network components, according to an embodiment of the present disclosure. The interactive case management system 16 may interact with various network components and devices such as the data source 12 and the third-party application 14. In one embodiment, the interactive case management system 16 may include the data intake module 30, the platform connection module 32, and the email mapping module 34. The interactive case management system 16 may also comprise the advanced filtering module 36 including a filter module 40, an analysis and visualization module 42 (AV module 42), and a decision module 44. The AV module 42 may include a file-type analysis module 46, an email communication analysis module 48 (ECA module 48), a data anomaly analysis module 50, a domain analysis module 52, and a DeDuplication module 54.

Data Intake Module

The data intake module 30 may be configured to interface between the data source 12 and the third-party application 14. The data intake module may implement a predetermined process (FIG. 3) for eliminating electronic files and related data that are irrelevant to an e-discovery request or other investigations from being ingested into the data repository 20.

At step 55, electronic files and related data located in the data source 12 are accessed. The data intake module 12 may access a collection of unprocessed, electronic, computer readable files from the data source 12. The data source 12 may present the files as a set of loose files in computer readable file system to the data intake module 30. Examples of these files may include, but are not limited to, system files, program files, document files, multimedia files, and emails. The files may be accessed as being related to a legal case or a custodian.

At step 56, file system information of the accessed files is collected. The data intake module 30 may determine various file system information associated with the accessed files using tools and techniques known in the art, related art, or developed later. Examples of the file system information may include, but are not limited to filename, file path, file type, system date, etc. The determined file system information may be stored as a record for each of the accessed files in the database 28. The data intake module 30 may create a separate such record for each case or custodian. A collection of these records may be arranged in a table referred to as an intake table.

At step 57, a hash value of a predetermined hashing algorithm is calculated for each of the accessed files and related data. The data intake module 30 may apply a predetermined hashing algorithm to the accessed files for calculating a hash value for each of these files. The hashing algorithm may transform a string of characters in the files into a shorter fixed-length value or key called a hash value (or hash code) that represents the original character string in the file. The length of the hash value may vary based on the applied hashing algorithm. Such determination of the hash values may be employed to label the files, wherein the label may facilitate to determine relevancy of the files for the e-discovery workflow or investigations.

At step 58, a file type for each of the accessed files is identified. Each of the accessed files may be analyzed by the data intake module 30 to identify the file types, which may refer to formats of the files. Examples of such file types may include, but are not limited to, PDF, PST email database, MS WORD processing, MOV video, WAV audio, and TIFF image. In one embodiment, the accessed files may be analyzed by grouping together the files based on the file type (hereinafter referred to as file type groupings). Each of the file type groupings may be marked with a predefined code, which may identify the 'type' of the electronic files in a particular grouping. Such identification of file types may be performed using a variety of techniques and tools known in the art, related art, or developed later. For example, 'File Investigator Tools' developed by Forensic Innovations, Inc. may be implemented by the data intake module 30 to identify the file types and generate the corresponding predefined codes. The data intake module 30 may map the generated codes for each of the identified file types into the intake table or a separate file type table, which may be stored in the database 28.

At step 60, the identified files may be filtered based on a variety of predefined or dynamically defined filter criteria to eliminate electronic files, which may be considered as irrelevant or non-responsive for the investigations. In one example, the files may be filtered based on a predefined or dynamically defined file path referring to a location (e.g., the data source 12) from which the file was obtained. When a 'file path' criterion is applied, the data intake module 30 may provide all the files, which were stored at a particular location defined by the file path, as a filter result. In some embodiments, the data intake module 30 may be configured to exclude all the files that were stored at the location defined by the file path and, in some other embodiments, provide those files as the filter result.

In another example, the files may be filtered based on a date range extending between a reference date and a desired date, both dates being inclusively or exclusively considered for returning a filter result. The reference date may refer to a date on which the corresponding file system was either created or modified on the data source 12. The desired date may refer to any date after the reference date, for e.g., the latest date or the date on which such filtering is being performed. When a 'date range' criterion is applied, the data intake module 30 may provide all the files, which may be created or modified between the reference date and the desired date, both inclusive, as a filter result. In some embodiments, the data intake module 30 may be configured to exclude all the files that are created or modified between the reference date and the desired date, both inclusive, and, in some embodiments, provide the remaining files as the filter result.

In yet another example, the files may be filtered based on one or more selected file types. The code for the selected file types may be determined using a file type identification tool, such as that mentioned above. The determined code may be compared against the codes in the file type table or the intake table for filtering the files. When a 'file type' criterion is applied, the data intake module 30 may provide all the files, whose associated file-type codes match the codes in the file type table or the intake table, as a filter result. In some embodiments, the data intake module 30 may be configured to exclude all the files whose associated file-type codes match the codes in one of these tables and, in some other embodiments, provide the remaining files as the filter result.

In a further example, the files may be filtered based on hash values of the accessed files. The data intake module 30 may compare the calculated hash value associated with each file with a list of hash values being irrelevant to ESI investigations and mentioned in one or more reference hash tables as being irrelevant. Those files having hash values matching hash values in the reference hash tables may be designated as non-responsive or irrelevant.

The above mentioned exemplary filter criteria may be applied in any order by the data intake module 30 upon a user request or selection. In one embodiment, the data intake module may apply the criteria in a preset order, namely, file path→date range→file type→hash value upon receiving a request from the user.

At step 74, if the accessed files satisfy all of the selected filter criteria, the files returned as a positive filter result may be referred to as files possibly relevant for the e-discovery workflow or investigations. The data intake module 30 may copy the obtained filter result including files and related data to a predetermined storage location such as the data repository 20. In some embodiments, the data intake module 30 may also store a copy of the relevant files and related data into the database 28. In some other embodiments, once the files and related data are stored in the data repository 20, the data intake module 30 may generate an intake summary report. This report may show a high-level overview of all the files and related data that may be stored in the database 28, and may indicate (1) the files and related data filtered out by the applied custom predetermined filter criteria, (2) the files and related data that were not copied into at least one of the data repository 20 and the database 28 due to an intake exception; and (3) the files and related data (in the data source 12) that may not be accessed or used by the interactive case management system 16.

At step 76, the rest of the files (hereinafter referred to as irrelevant files) in the data source 12, which may not be returned as a positive filter result upon applying the predetermined filter criteria, may be associated with an indicator such as a label stating "Filtered" by the data intake module 30. The indicator may identify the irrelevant files as being already subjected to the filter criteria at least once by the data intake module 30. These irrelevant files and related data may not be copied from the data source 12 to the predetermined storage location such as the data repository 20 or the database 28.

At step 78, a record is created for the filter result in the intake table. The data intake module 30 may create a record in the intake table for each of the relevant and irrelevant files, and related data. The record may include, without limitation, the filtering information about each of the relevant files and the irrelevant files. Examples of the filtering information may include, but are not limited to, a list of values inputted for various filter criteria such as those mentioned above, etc. In some embodiments, the data intake module 30 may embed files corresponding to the filtering information in the intake table.

Figure 4A:
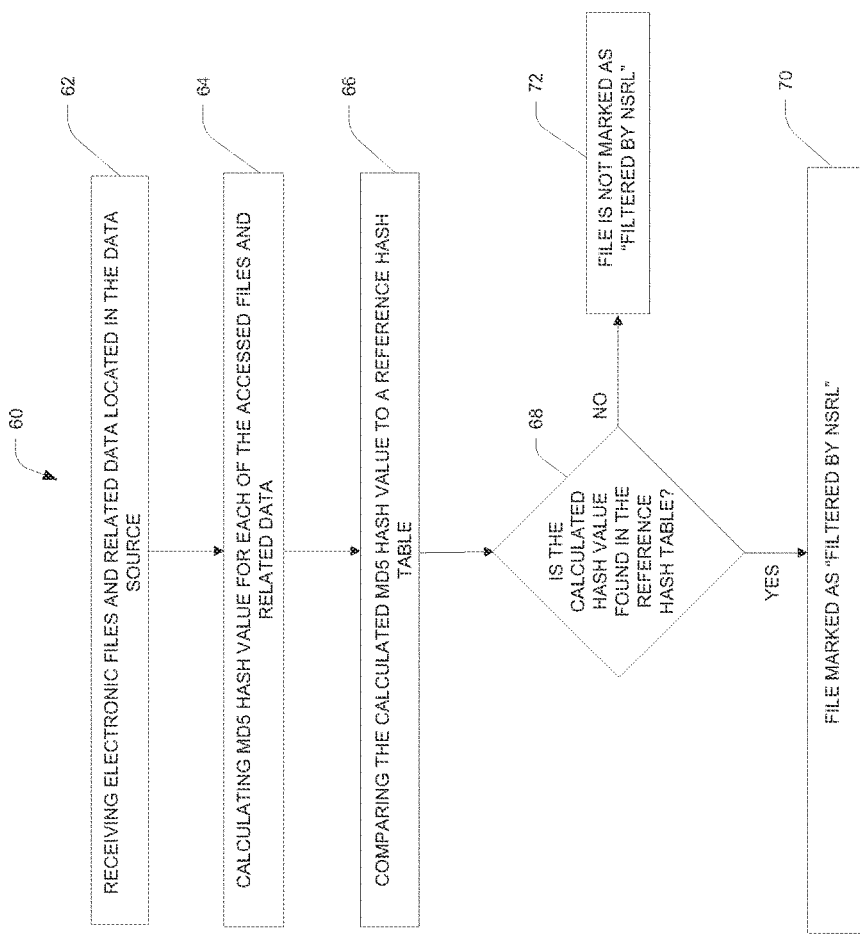
FIG. 4A is a flow chart illustrating an exemplary method for performing filtering using hash values using the interactive case management system of FIG. 1A, according to an embodiment of the present disclosure.
Figure 4B:
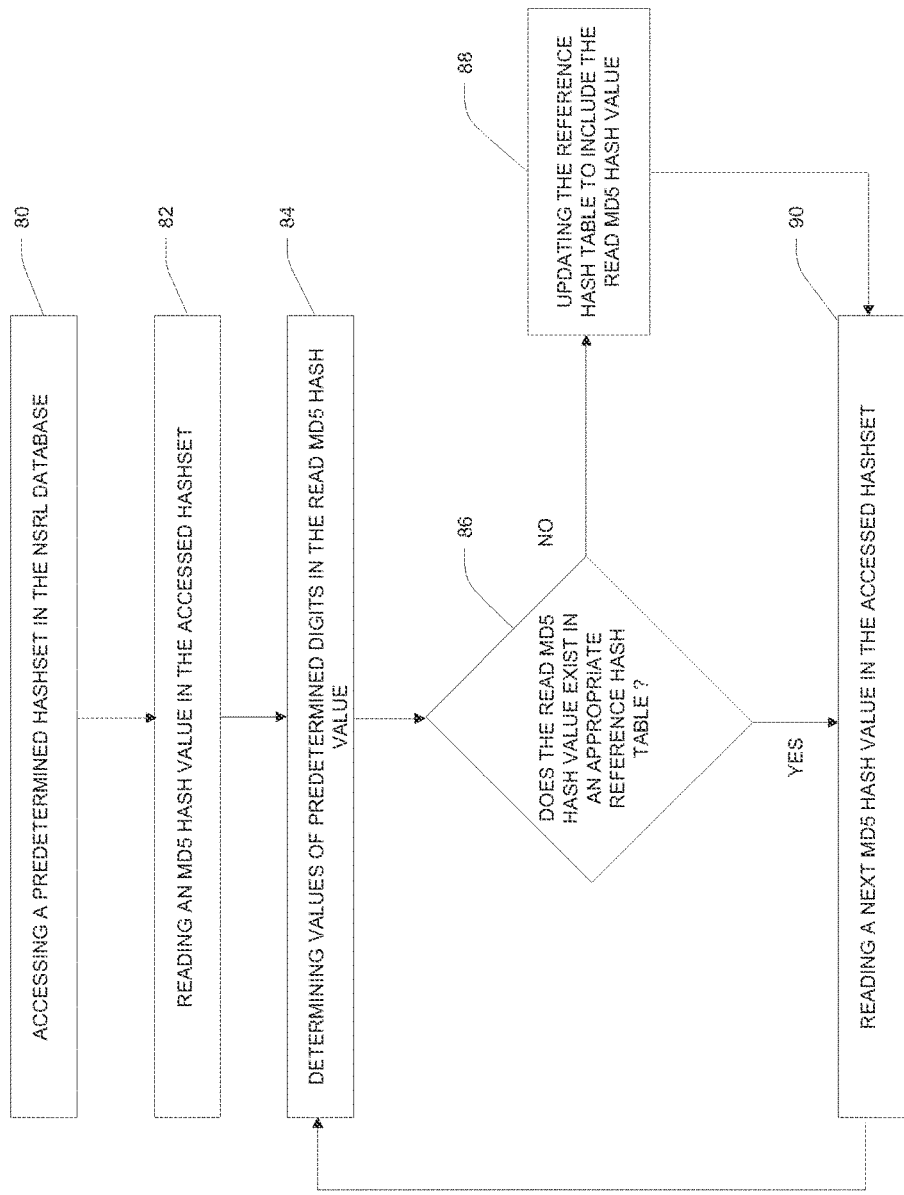
FIG. 4B is a flow chart illustrating an exemplary method of creating a reference hash table using the interactive case management system of FIG. 1A for implementing the method of FIG. 4A, according to an embodiment of the present disclosure.

FIG. 4B, illustrates an example of the process by which processor 22 or any other processor creates one or more reference hash tables for being used or referred to by the interactive case management system 16. For example, at step 80, a predetermined hashset in the National Software Reference Library (NSRL) database is accessed. The hashsets are collections of files known to be irrelevant to investigations (e.g., .exe files, .dll files, etc. for known programs). The processor 22 may access at least one of a variety of predetermined hashsets provided by the National Institute of Standards and Technology (NIST). For example, the processor 22 may use the "minimal" hashset, which includes only one example of every file in the NSRL.

At step 82, an MD5 hash value in the accessed hashset is read. The processor 22 may read the "minimal" hashset file-by-file to determine hash values corresponding to the predetermined hashing algorithm, such as the MD5 hashing algorithm.

The number of hash values in the (NSRL) database is large. If all hash values in the NSRL database are provided in a single reference hash table, the time necessary to compare a hash value to all hash values stored in the single reference hash table may be quite long. To shorten the comparing process, a plurality of reference hash tables may be employed, each for a different segment of the hash values.

At step 84, values of predetermined digits in the MD5 hash value is determined. The read MD5 hash values may be represented in the hexadecimal numbering system. The processor 22 may segregate the MD5 hash values into different reference tables based on the predetermined digits in the hexadecimal MD5 hash values. For example, the read MD5 hash values may be separated into 256 reference hash tables based on the first two hexadecimal digits. The number of predetermined digits may vary from one to 'X', where 'X' is less than the maximum number of digits in a particular hash value, such as the MD5 hash value.

Figure 5:
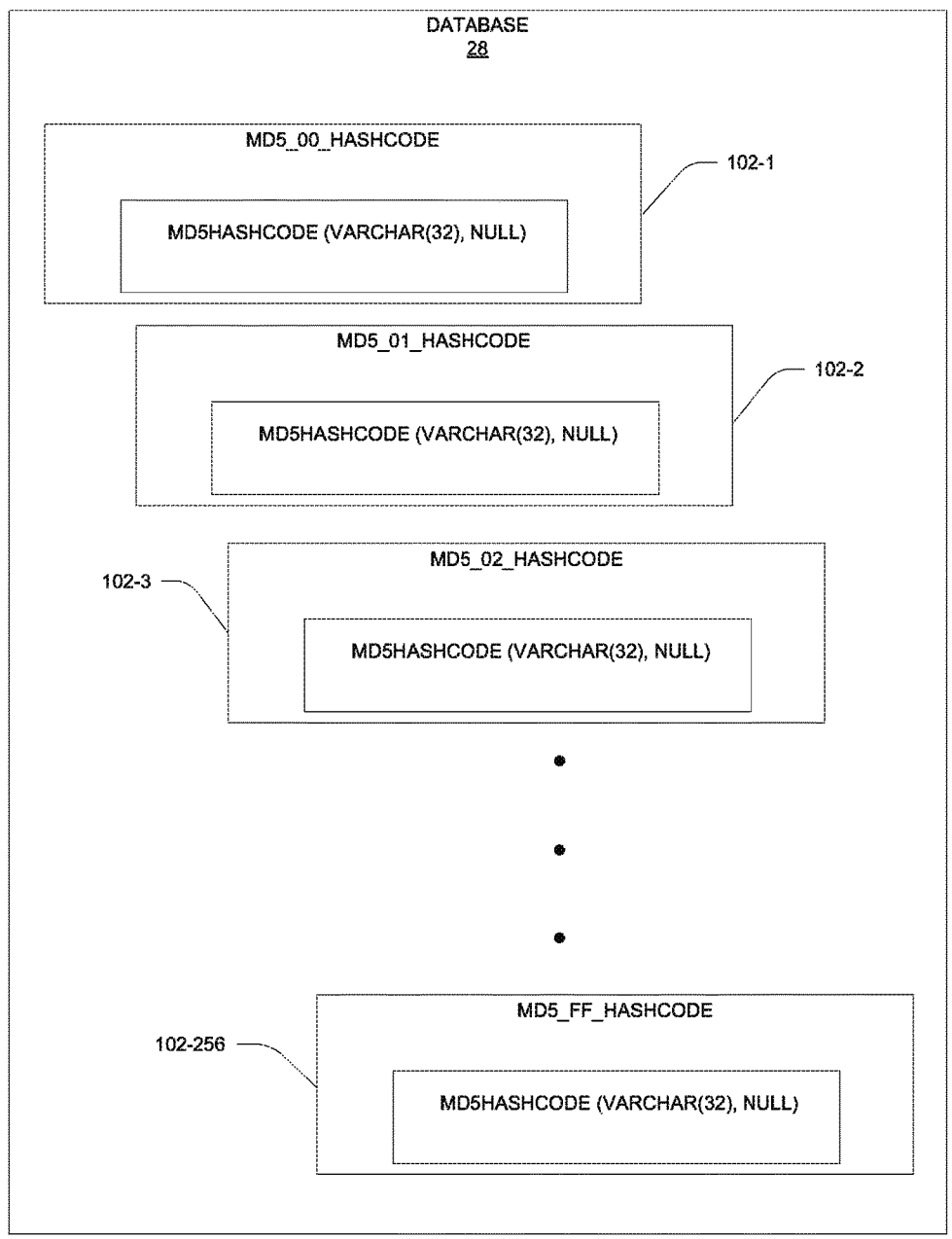
FIG. 5 is a schematic that illustrates exemplary reference hash tables implemented using the interactive case management system of FIG. 1A, according to an embodiment of the present disclosure.

The processor 22 may determine the values of the predetermined digits, such as the values of first two hexadecimal digits, which may range from 00 to FF in the MD5 hash values. The processor 22 may create a separate reference hash table for each value of the first two hexadecimal digits. In one example, the processor 22 may create 256 reference hash tables 102-1, 102-2, . . . , 102-256 (collectively, reference hash tables 102 as shown in FIG. 5) based on the first two hexadecimal digits in the MD5 hash values.

At step 86, the processor 22 may determine whether a MD5 hash value read from the NSRL hashset exists in the appropriate reference hash table as indexed by the predetermined digits. In one embodiment (FIG. 5), each reference hash table may be named using the same first two hexadecimal digits. For example as shown, a reference hash table 102-256 may be named as 'MD5_FF_HashCode', where 'MD5' may refer to the MD5 hashing algorithm, 'FF' may correspond to the first two hexadecimal digits of the MD5 hash values contained in the table 102-256, and 'HashCode' may refer to the type of content, i.e., hash values, stored in that table 102-256.

For each read MD5 hash value, the processor 22 may identify the corresponding reference hash table based on the values of the predetermined digits, such as the first two hexadecimal digits. In one example, when the value of the first two hexadecimal digits may be "02", the processor 22 may identify the table 102-3 as the corresponding reference hash table. The data intake module 30 may then check whether the read MD5 hash value exists in the identified reference hash table.

At step 88, if the read MD5 hash value is not in the appropriate hash value table, the appropriate reference hash table is updated to include the read MD5 hash value. If the read MD5 hash value is not found in the appropriate reference hash table, such as the table 102-3, the processor 22 may update the corresponding reference hash table to include the read MD5 hash value. Processing proceeds to step 90.

At step 90, if the read MD5 hash value is found in the appropriate reference hash table, then the read MD5 hash value may not be added to the reference hash tables. Therefore, the processor 22 may read the next MD5 hash value in the accessed hashset, such as the "minimal" hashset, and reiterates the steps 84 to 90. In this manner, the data intake module 30 may store every MD5 hash value in the accessed hashset into one of the 256 tables based on the determined values of the predetermined digits in the hash values to create a complete set of reference hash tables.

Figure 3:
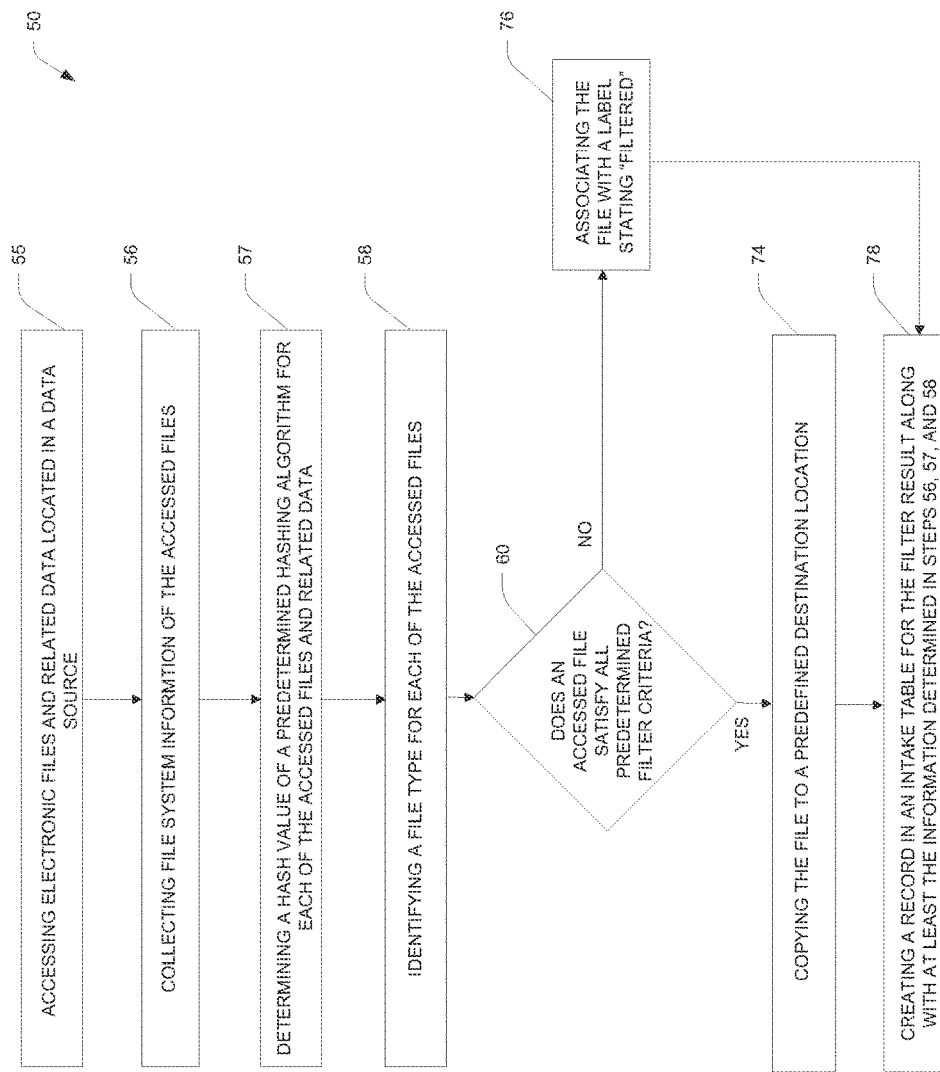
FIG. 3 is a flow chart illustrating an exemplary method for implementing a data intake module of the interactive case management system of FIG. 1A, according to an embodiment of the present disclosure.

Once the reference hash tables are created, they can be used to assess whether files (whose hash values are determined at step 57 in FIG. 3) are irrelevant to the investigation or may potentially be relevant (as determined at step 60 in FIG. 3). Exemplary steps for filtering the accessed files and related data using hash values are shown in FIG. 4A. At step 62, the electronic files and related data located in the data source 12 are received. The data intake module 30 may receive the files for which a hash value is to be determined. The data intake module 30 may employ various hashing algorithms known in the art, related art, or developed later including SHA algorithms for determining the corresponding hash value for each of the files.

At step 64, MD5 hash value is calculated for each of the received files and related data. In one embodiment, the data intake module may apply the MD5 hashing algorithm to generate a 128-bit (16-byte) MD5 hash value for each of the received files. The calculated MD5 hash values may be expressed in text format as a 32 digit hexadecimal number; however other numbering systems known in the art, related art, or developed later including binary numbering system, decimal numbering system, or any combination thereof may be used for representing the hash values.

At step 66, the calculated MD5 hash value is compared with the reference hash table in which all hash values have the same predetermined digits as the hash value calculated in step 64.

At step 68, the data intake module 30 may check whether the calculated MD5 hash value for each file in the data source 12 exists in the appropriate reference hash table. At step 70, if the MD5 hash value is found in the appropriate reference hash table, the corresponding file may be marked by a variety of indicators known in the art, related art, or developed later including textual indicators (e.g., alphabets, numerals, strings, special characters, etc.), non-textual indicators (e.g., different colors, color luminance, patterns, textures, graphical objects, etc.), or any combination thereof. For example, the file may be marked with a label stating "Filtered by NSRL", which may indicate that the file is not relevant to the e-discovery request or investigations.

However, in one embodiment, if the calculate MD5 hash value is not found in any of the reference hash tables, at step 72, the corresponding file may be left unmarked indicating that the data intake module 30 may be relevant to the investigation. Such unmarked files may be re-evaluated, e.g., by a user to ascertain the relevancy of the file for the e-discovery workflow or investigation. The data intake module 30 may be configured to generate a log of the irrelevant files and related data.

Since the data intake module 30 may filter out the irrelevant files and related data from the data source 12, the data intake module 30 may provide significant cost savings for managing and processing the relevant files and related data being ingested into the third-party application 14. Additionally, the data intake module 30 may facilitate communication of the current case status to clients or information requestors. Further, the data intake module 30 may be automated using preset filter criteria and login credentials being dynamically communicated to the data source 12 and the third-party application 14 for enhanced reporting, error reduction, and better productivity.

Platform Connection Module

Figure 6:
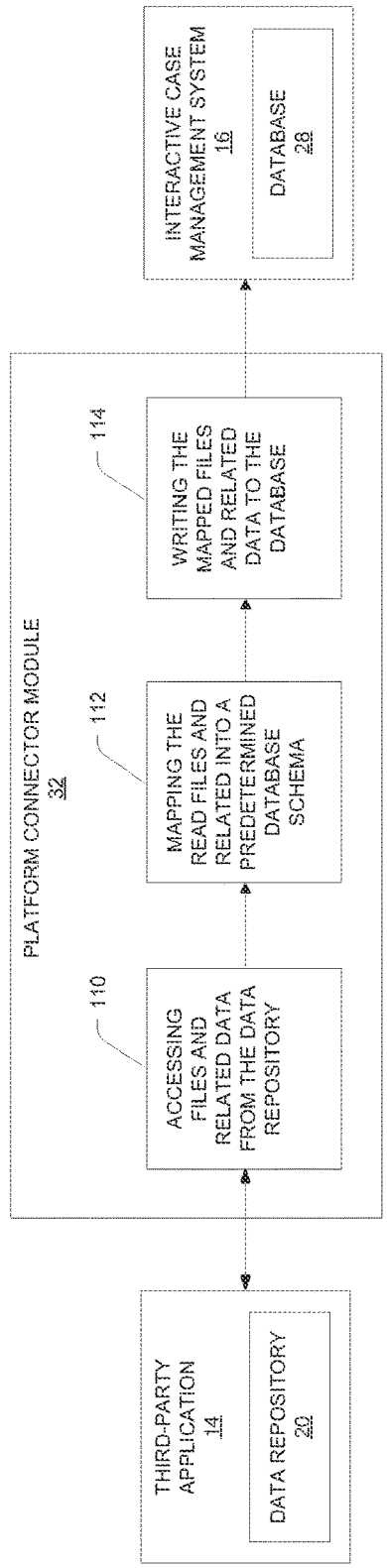
FIG. 6 is a schematic that illustrates an exemplary method for implementing a platform connection module of the interactive case management system of FIG. 1A, according to an embodiment of the present disclosure.

The platform connection module 32 may communicate with the data repository 20 over the network 18. The data repository 20 may store files and related data in a variety of formats and schemas known in the art, related art, or developed later including proprietary file systems and database schemas. The platform connection module 32 may be implemented as illustrated in FIG. 6.

At step 110, files and related data stored in the data repository 20 are accessed. In one embodiment, the platform connection module 32 may be configured to login to the third-party application 14 using predefined or dynamically defined login credentials, e.g., a username and password, to gain access to the files and related data stored in the data repository 20. In other embodiments, the platform connection module 32 may be configured to use a variety of access techniques known in the art, related art, or developed later including predefined or dynamically provided biometric data (e.g., fingerprint, retina scan, etc.), audio data (e.g., voice), and video data (e.g., face scan, picture scan, etc.). After login, the platform connection module 32 may determine the type of database schema and the type of file system implemented on the data repository 20. Additionally, the platform connection module 32 may receive database information including, but not limited to, specific database instance and file share location of the data repository 20 from a user. The platform connection module 32 may store this 'type' and the database information about the data repository 20 in a configuration record in the database 28.

The platform connection module 32 may be configured to interact with the third-party application 14 using various access protocols or technologies known in the art, related art, or developed later including SQL queries. The platform connection module 32 may use the configuration record to interact with the data repository 20. The data repository 20 may include a table, hereinafter referred to as DR table, including metadata of electronic files stored in the data repository 20 as well as the electronic files themselves. The platform connection module 32 may refer to the DR table (not shown) to determine the location of extracted, optical character recognition (OCR) converted, or any other type of data.

At step 112, the platform connection module 32, in one embodiment, may be configured to map the read files and related data into a predefined schema of the database 28 such that the files and related data are usable by the interactive case management system 16 or any other reporting and filtering application or system compatible with the interactive case management system 16. For this, the platform connection module 32 may parse the accessed data (e.g., body of an email, content of a word file, a file embedded in another file, etc.) and related metadata for being inserted into one or more tables in the predefined schema of database 28. In one example of an email file, the platform connection module 32 may parse the corresponding email address fields stored in the database schema of the data repository 20. The email address fields may be parsed into individual email addresses, email domains (e.g., text after "@" symbol for SMTP addresses, text after "O" portion of the x500 addresses, etc.), and sender-recipient pairs. In one embodiment, the platform communication module 32 may insert the individual email addresses into an alias table, the email domains into a domains table, and each sender-recipient pair into an email communication table. In another embodiment, the platform connection module 32 may insert the parsed data (e.g., individual email addresses, email domains, etc.) and related metadata (e.g., filenames, hash values, size, etc.) in an inventory table. Various modules of the interactive case management system 16 may use the inventory table to map a predetermined set of files and related data into predefined tables such as the alias table, the domains table, and the email communication table, for analyses, reporting, filtering, or any other operation. Each of the alias table, the domains table, the email communication table, and the inventory table are discussed below in greater detail.

In another example, the database schema of the data repository 20 may include a table having fields "Author_Name" and "Email_Subject" and the predefined schema of database 28 may have a table having fields "Author" and "Subject". The platform connection module 32 may read files and map the related data from the "Author_Name" field to the corresponding "Author" field of the predefined schema of database 28. Similarly, the platform connection module 32 may map the data from the "Email_Subject" field to the corresponding "Email" field of the predefined schema of database 28.

In some embodiments, the platform connection module 32 may reverse map information associated with the mapped files and related data from the predefined schema of the database 28 to that of the data repository 20. Such reverse-mapped information may include data added by the interactive case management system 16. Also, such reverse-mapped information may be tagged to facilitate tracking of the tagged data, which is mapped in the predefined schema of database 28. Examples of the reverse-mapped information may include, but are not limited to, custodian ID, media ID, data source ID, work package ID, and so on. At step 114, the mapped files and related data in the predefined schema may be stored in the database 28.

In some other embodiments, the platform connection module 32 may be configured to index the mapped files and related data using a variety of types of indexes known in the art, related art, or developed later. Examples of the types of indexes may include, but are not limited to, clustered, non-clustered, hash, unique, spatial, and so on. In one embodiment, the platform connection module 32 may be configured to create a full-text index including metadata corresponding to the mapped files. The platform connection module 32 may use the full-text index to support full-text searching of various data records stored in the database 28.

Search Capability and Search Report

Based on a search term or metadata element inputted by a user, the case management systems 16 may use SQL queries to search for relevant data records and the corresponding files using the full-text index. The case management systems 16 may employ various tools, techniques, and syntax known in the art, related art, or developed later including "dtSearch" searching technology to implement full-text searching.

Each of the search terms used for searching the data records may be stored as metadata for a corresponding file in the database 28. As such, the interactive case management systems 16 may generate statistical reports including search results. In one example shown in FIG. 7, a search report 120 may be displayed based on one or more predetermined categories including (1) one or more terms used for searching the data records in the database 28, and/or (2) a custodian of the files corresponding to the searched data records. Under each category, the search report 120 may be represented under various columns named as "Total Hits", which may refer to the total number of instances in which the searched term was found; "Docs" may refer to the total number of distinct documents or files containing the searched term; "Size" may refer to the total size (e.g., in gigabytes) of the "Does"; "Docs w/Families" may refer to total number of distinct documents after the document families are expanded to include all related items such as attachments, etc. of the "Does"; and "Family Size" may refer to the total size (e.g., in gigabytes) of the "Docs w/Families". Additionally, in one embodiment, the search results may be represented under the columns named as "Unique Docs" and "Unique Size". The column "Unique Docs" may refer to the total number of documents or files, which are getting exclusively hit by each of the search terms as compared to other terms in a search query. For instance as shown, the search term "Time" may result an exclusive search hit on "35,181" documents which none of the other terms were found to hit on. In other words, entries under the column "Unique Docs" may represent 'Search Term Impact' indicating that if a particular search term is removed, the corresponding number of documents or files under this column would be dropped from the "Total Hits". The column "Unique Size" may refer to the total size (e.g., in gigabytes) of the "Unique Docs".

Email Mapping Module

The email mapping module 34 may be configured to communicate with the platform connection module 32 or the database 28 to access the parsed data generated by the platform connection module 32. In one embodiment, the email mapping module 34 may be configured to normalize the parsed data, for e.g., stored in the database 28.

Figure 8A:
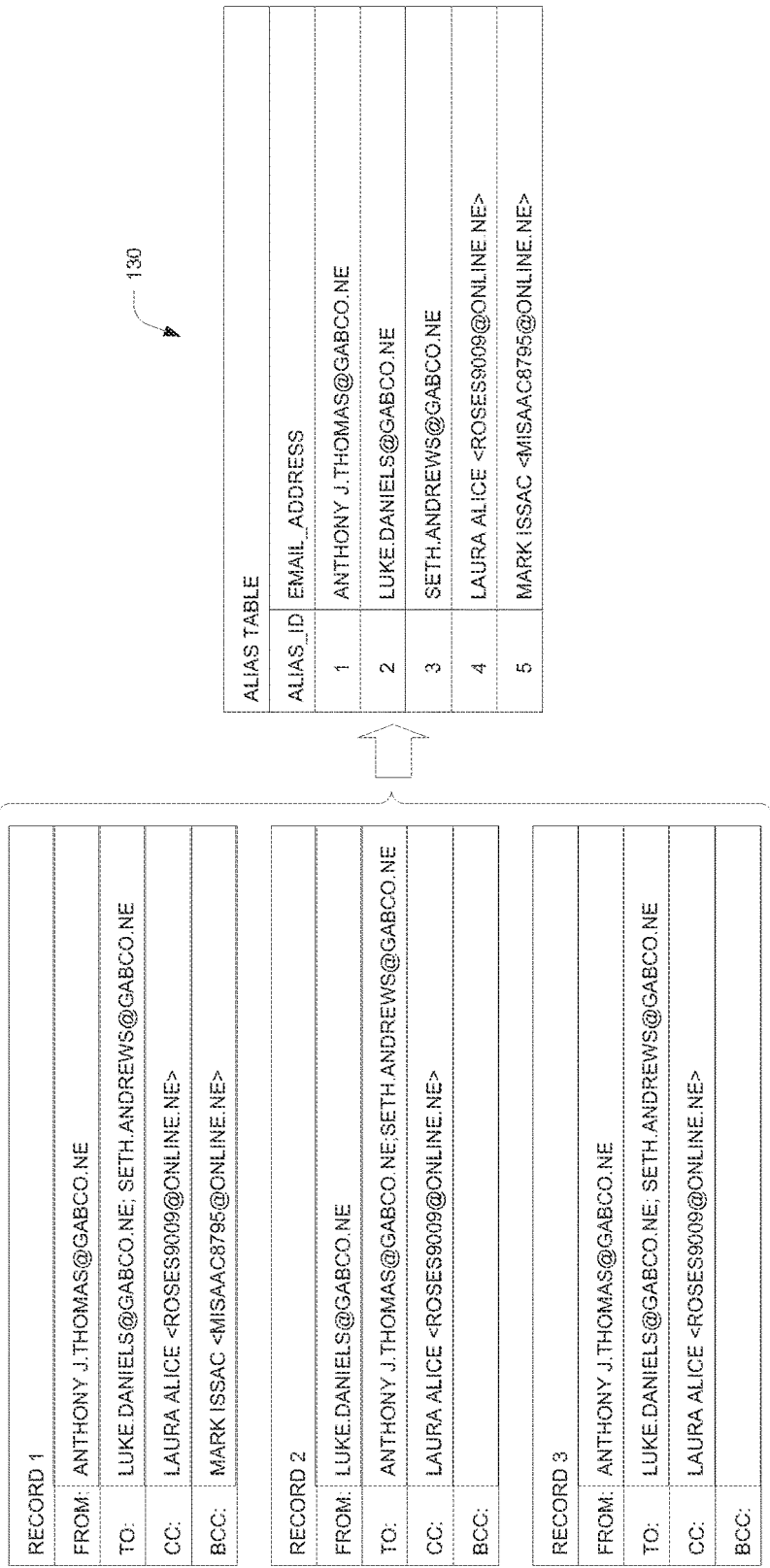

In a first example shown in FIG. 8A, the parsed data of three email records, namely "Record 1", "Record 2", and "Record 3", may be mapped into an alias table. Each of the records may include multiple email fields, for e.g., "FROM", "To", "CC", and "BCC", having multiple email-addresses as data. For instance, as shown, the "Record 1" may include email addresses "anthony.j.thomas@gabco.ne" in the "FROM" field; "luke.daniels@gabco.ne" and "seth.andrews@gabco.ne" in the "To" field; "roses9009@online.ne" in the "CC" field; and "misaac8795@online.ne" in the "BCC" field.

Among these records, email addresses such as "luke.daniels@gabco.ne" may occur more than once. The email mapping module 34 may be configured to normalize the parsed data by creating an alias table including a unique set of data from the records. For instance, the alias table 130 may include columns, namely, "Alias_ID" and "Email_Address" for storing only a single instance of the email addresses in the email records. Each instance of the unique email address may be saved under the column "Email_Address" and may be given a distinct identity (ID) under the column "Alias_ID". For example as shown, the email address "luke.daniels@gabco.ne" occurs in all the email records "Record 1", "Record 2", and "Record 3". However, only a single instance of this email address may be saved in the alias table 130 under the "Email_Address" column and is given a distinct ID number "2" under the "Alias_ID" column. Single instances of other email addresses may be stored in the alias table 130 in a similar manner. In another embodiment, the email mapping module 34 may store a unique set of email domains such as gabco.ne and online.ne in a domains table (not shown), which may be similar to the alias table 130.

In a second example illustrated in in FIG. 8B, the parsed data may include a record 132 having a collection of email addresses. The email mapping module 34 may be configured to normalize the email addresses based on the communicating parties related to these email addresses. The email mapping module 34 may associate multiple email addresses with a communicating party, such as an individual, and may represent them as a single 'Email party' in an alias table 134. Similarly, the email mapping module 34 may removably associate multiple email addresses in a record 136 with a group of individuals corresponding to the same email domain, organization, department, or entity (FIG. 8C) and may represent them as a single 'Email party' in an alias table 138. In some embodiments, such 'email party' may refer to a non-custodian party created to organize and/or assign one or more email addresses to a named entity for graphical representation and reporting. Other criteria for normalizing the data may be contemplated by those having skill in the art.

The email mapping module 34 may store the created alias tables such as the alias tables 130, 134, 138 and the domains table in the database 28. Such alias tables 130, 134, 138 may be used for the purpose of generating various reports and graphical representations, discussed below in greater detail with the descriptions of the AV module 42.

Advanced Filtering Module

The advanced filtering module 36 may be configured to parse the data corresponding to the files received from one or more modules, such as the platform connection module 32, into logical segments and perform predetermined analyses on the parsed data. The advanced filtering module 36 may include the filter module 40, the AV module 42, and the decision module 44.

Filter Module

The filter module 36 may perform filtering of the files, which may be registered in the inventory table created by the platform connection module 32, based on various selected facets of the data and values for the selected facets. In some embodiments, the filter module 36 may use the metadata associated with the files to identify those files wherein the value of the selected facets match the filter criteria. Examples of these facets may include, but are not limited to, custodians, dates, email domains, file-types, terms or keywords, or current states of the electronic files, or any combination thereof. The filter module 36 may be further configured to apply one or more selected facets as a criterion for filtering the data. The filtered data and the associated files may be sent to the AV module 42 or the decision module 44 as selected by a user for analyses.

Analysis and Visualizations Module (AV Module)

The AV module 42 may be configured to analyze the filtered data and the corresponding files received from the filter module 36 and represent the analyzed data in interactive formats, which may be viewed on, exported, mapped, or downloaded to various computing devices known in the art, related art, or developed later. The AV module 42 may include the file type analysis module 46 (FTA module 46), the email communication analysis module 48 (ECA module 48), the domain analysis module 50, the data anomaly analysis module 52, and the deduplication module 54.

File Type Analysis Module (FTA Module)

The FTA module 46 may represent the electronic files collectively as interactive graphs (not shown) based on file type. Examples of the graphs may include, but are not limited to, pie charts, bar graphs, line graphs, pictographs, and cosmographs. In one example, such graphs may illustrate count, file size, or any other aspect of the electronic files for all custodians or for one or more selected custodians. In another example, the FTA module 46 may be configured to create multiple sets of graphs based on parent-level file type groups, email items and attachments, all levels of file type groups, and so on. Alternatively or additionally, the file types and associated information (e.g., file name, file ID, custodian, etc.) may be represented in a grid for display. In some embodiments, the associated information such as file names may be hyperlinked to provide access to the files stored in the database 28. Other embodiments of the graphs may include the files being embedded to the corresponding file types, which may be represented in the grid for display.

Email Communication Analysis (ECA) Module

In one embodiment, the ECA module 48 may parse the received filtered files to identify email files among them. For each of the identified email files, the ECA module 48 may access the associated records and related alias tables (including the domains tables and other similar tables), which may be created by the email mapping module 34 and are stored in the database 28.

Figure 9:
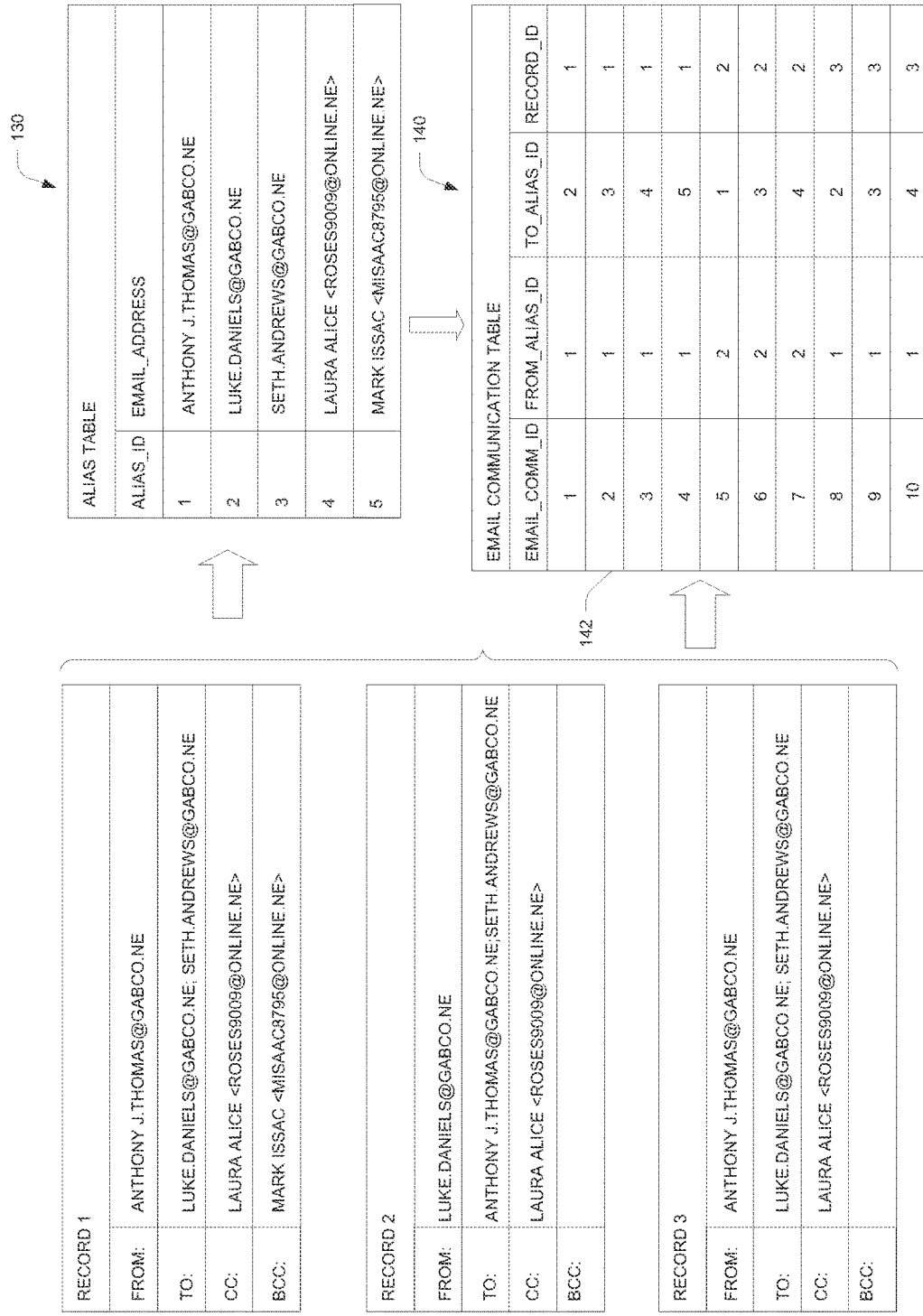
FIG. 9 illustrates an exemplary email communication table generated using the interactive case management system of FIG. 1A, according to an embodiment of the present disclosure.

In an illustrated example shown in FIG. 9, the email files in the filtered data may refer to email records, namely 'Record 1', 'Record 2', and 'Record 3' and the corresponding alias table 130 (discussed in the description of FIG. 8A) stored in the database 28. The ECA module 48 may be configured to use the email records and the alias table 130 to create an email communication table 140. The exemplary table 140 may include multiple columns, namely, "Email_Comm_ID", "From_Alias_ID", "To_Alias_ID", and "Record_ID". The "Email_Comm_ID" may refer to a distinct ID of a record made in the email communication table 140. The "From_Alias_ID" may refer to the "Alias_ID" of a sender's email address in the alias table 130. The "To_Alias_ID" may refer to the "Alias_ID" of a recipient's email address in the alias table 130. The "Record_ID" may refer to the email record in the database 28 for which a corresponding record is made in the email communication table 140.

The email communication table 140 may store multiple distinct records, each corresponding to a sender-recipient pair using the assigned "Alias_ID" number for the email addresses in the alias table 130. For example, a record 142 in the email communication table 140 may have the "Email_Comm_ID" as "2" referring to a distinct record ID in the table 140, the "From_Alias_ID" as "1" referring to the email address "anthony.j.thomas@gabco.ne" in the alias table 130, the "To_Alias_ID" as "3" referring to the email address "seth.andrews@gabco.ne" in the alias table 130, and the "Record_ID" as "1" referring to the email record "Record 1" in the database 28. Similarly, other entries may be created in the email communication table 140.

Figure 10B:
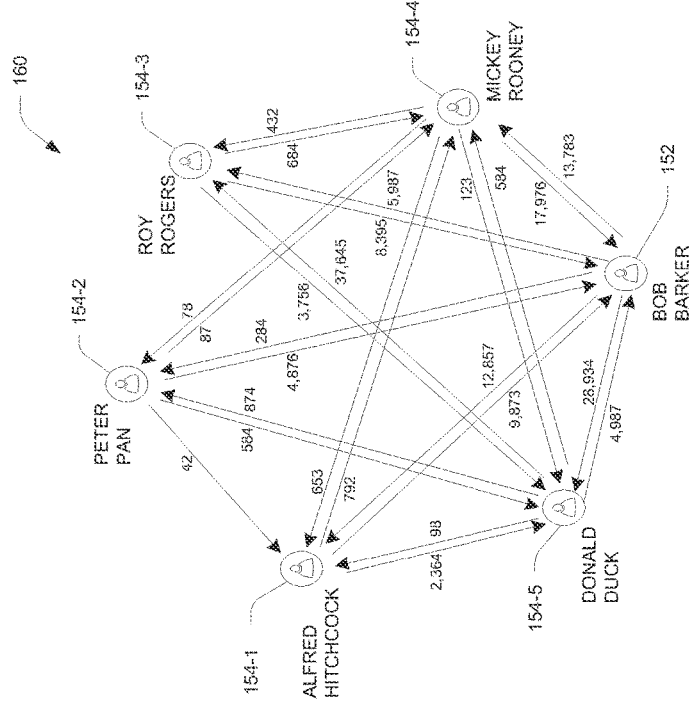
FIGS. 10A, 10B, and 10C illustrate exemplary communication diagrams generated using the interactive case management system of FIG. 1A, according to an embodiment of the present disclosure.
Figure 10A:
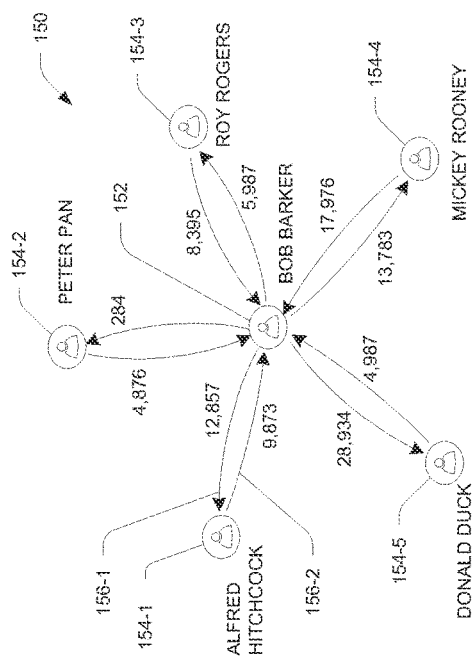

In one embodiment, the ECA module 48 may be configured to use the email communication table 140 for displaying email communications between individuals or various other entities such as a group of individuals, organizations, etc. graphically. In an illustrated example shown in FIG. 10A, an email communication diagram 150 may represent communication between one or more email parties by way of nodes and lines. Each node, for e.g. a node 152, may represent an email party referring to a logical grouping of email addresses based on one or more predetermined characteristics such as an individual (e.g., indicated by metadata, an email name, etc.), a workgroup (e.g., indicated by metadata, a common keyword in the email name, etc.), or a domain, organization, department or entity (e.g., indicated by metadata, a domain name, etc.). Each logical grouping of email addresses may include at least one email address.

The ECA module 48 may be configured to provide different variations of the email communication diagrams based on characteristics of the email party selected by a user. Examples of these characteristics may include, but are not limited to, top communicators, custom communicators, and single party. In some embodiments, a selection of the 'top communicators' characteristic may result to display the custodian and/or email party that has the highest communication volume relative to others; the 'custom communicators' characteristic may result to display communication channels and other details (e.g., email count) between selected custodians and/or email parties; and the 'single party' characteristic may result to display the communication channels and the other details of only one custodian or email party. In some other embodiments, the ECA module 48 may display an email communication diagram for all email addresses in the data received based on facets selected (or applied) by the filter module 36.

The email communication diagram 150 may represent communication (such as emails, SMS messages, etc.) of a top communicator with other email parties. For example, the node 152 may represent an email party such as "Bob Barker", who may be a top communicator having the largest number of occurrences in the email records. Nodes such as the node 152 may refer to the logical grouping having only one email address. However, the node, and hence the email party, may be customized to include multiple email addresses from the given collection of records stored in the database 28 for a particular case or custodian. The node 152 may communicate with different nodes such as nodes 154-1, 154-2, 154-3, 154-4, and 154-5 (collectively, nodes 154). Each of the nodes 154 may be connected to the node 152 by one or more lines. For example, the node 154-1 may be connected to the node 152 by two lines such as arrows 156-1 and 156-2 (collectively, the arrows 156). Each line may represent a collective number of communications and direction of communications between at least two nodes or email parties. The line such as the lines 156 may refer to counts and/or links to the email records represented by them. In one embodiment, the lines 156 may be curved and indicate the direction of communication by way of the pointing direction of the arrow heads.

Figure 10C:
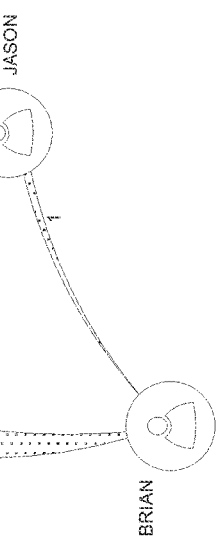

In another example (FIG. 10B), an email communication diagram 160 may represent a customized communication among multiple email parties, each represented as nodes and connected by lines. In another embodiment, the lines may be straight indicating the direction of communication by a pointing direction of the arrow heads. Nodes adjacent to the tail of each line may represent a sender and the nodes adjacent to each arrow head may represent a recipient. In a further embodiment (FIG. 10C), the direction of communication may be indicated through narrowing of the lines. The nodes adjacent to a broad side of the line may represent a source address (or a sender) and the node adjacent to a narrow side of the line may represent a destination address (or a recipient). In some embodiments, an email communication diagram may include lines having dynamic thickness, which may be directly related to the count, volume, or any other characteristic of the records being represented, by these lines.

Some other embodiments may include each line having a predetermined color density corresponding to the number of communications between the addresses (such as email addresses) associated with the nodes of each line. The count/volume of communications, such as email, SMS messages, etc., for each sender-recipient pair in each direction may be indicated near the line. For example, the line 156-1 in the diagram 150 shows that 12,857 emails were sent from "Bob Barker" (node 152) to "Alfred Hitchcock" (node 154-1). Similarly, various nodes and lines in an email communication diagram may represent a diversity of information including, but not limited to, properties or statistics such as emails communicated with attachments, total size of the communicated emails, and emails communicated during a particular time period. Such graphical representation of communications between various nodes may assist to identify witnesses or depositories of data that may be considered for the e-discovery investigations.

In one embodiment, the ECA module 48 may be configured to use the generated email communication diagrams, such as the diagram 150, for determining unknown witnesses or key witnesses for e-discovery investigations. In one example, the ECA module 48 may compare the email parties represented as nodes in the email communication diagrams with the custodians associated with a case. Upon comparison, the ECA module 48 may be configured identify one or more email parties as unknown witnesses when the one or more email parties are not same as the custodians associated with the case. In another example, the ECA module 48 may be configured to identify a key witness in an ESI investigation when an email party (represented as nodes) may be (1) same as one of the custodians associated with the case, and (2) has the largest count of communications (e.g., emails sent and emails received) relative to the count of communications of other email parties.

Domain Analysis Module

The domain analysis module 52 may be configured to categorize and graphically represent the filtered files based on email domains. For example, the filtered files may be represented domain-wise in an interactive tabular format under various column headers such as domain name, sender count, recipient count, etc. Each of the represented domains may be hyperlinked or referenced to the group of files associated with that domain. Such group of files, in one embodiment, may be provided to a user for access by being represented using associated metadata such as file ID, custodian, file name, etc. in a grid or various other representations known in the art, related art, or developed later for display. In some embodiments, the files may be embedded with the associated metadata represented in the grid for display.

Data Anomaly Analysis Module

The data anomaly analysis module 50 may be configured to represent a volume of data in multiple time segments over time for a given custodian or a group of custodians. Such timeline diagram may enable a user to identify potential points in time where the data may be missing. Different categories of data may be represented over time by the data anomaly analysis module 50. Examples of these categories may include, but not limited to, email volume, electronic documents (Edocs) volume, emails sent, and emails received.

The 'email volume' may refer to a count of all email-type records for a given custodian, where each record may be categorized by date. A corresponding email volume report may or may not be based on email mappings performed by the email mapping module 34. The 'Edocs volume' may refer to a count of Edocs-type records for a given custodian, where each record may be categorized by date. The 'emails sent' may refer to a count of email records for a custodian based on the email addresses that have been mapped to that custodian, where the email addresses may be categorized by date. The data anomaly analysis module 50 may consider every instance of email records where one of those "mapped" email addresses may be found in the "FROM" field of an email file to determine a count of emails sent. The 'emails received' may refer to a count of email records for a custodian based on the email addresses that have been mapped or related to that custodian, where the email addresses may be categorized by date. Every email record where one of those "mapped" addresses are found in at least one of the email recipient fields, namely, "TO", "CC", and "BCC" may be considered by the data anomaly analysis module 50 to determine a count of emails received.

In one embodiment, the data anomaly analysis module 50 may use an email communication table, such as the table 140, for plotting the total number of emails communicated by each email party over time in a graph. In an illustrated example shown in FIG. 11, the timeline diagram 180 is a graph showing the total number of emails on y-axis and time (in years) on x-axis. In some embodiments, the timeline diagram 180 may include the y-axis referring to units of digital information known in the art, related art, or developed later including kilobytes (KB), megabytes (MB), and gigabytes (GB); and x-axis referring to time in months, days, hours, or any other known or later developed unit capable of being used to represent time. In some other embodiments, the y-axis may represent the total number of electronic files, emails sent, emails received, or any other aspect of data known in the art, related art, or developed later.

A curve may be plotted on a timeline diagram for every record in the email communication table, such as the email communication table 140. Each record may be associated with at least one date (e.g., sent and received dates for email; created and modified dates for non-email files, etc.) which may be assigned as year, month, day, or any other unit of time. In some embodiments, an email-sent-date may be prioritized over an email-received-date and a file-modified-date may be prioritized over a file-creation-date for plotting a curve on the timeline diagram. Each plotted curve may refer to a single custodian, a set of custodians grouped together, or any other entity such as an email party or group of email parties.

In one example, a point P on the curve 182 may represent a volume of email files as "20,000" in the year "1997" for the email party "Steven Kean". In another example, the timeline diagram 180 may include the curve 182 drawn for a group of custodians and the related aggregated data being represented along the y-axis as either an average or a cumulative total for the group of custodians. The data anomaly analysis module 50 may be further configured to provide interactive timeline diagrams. In one example, an interactive timeline diagram may be zoom-able to interactively expand or contract the timeline, for e.g., illustrated on the x-axis, into different time segments along the x-axis. Other examples may include the timeline diagram being enabled to allow interactive selection of points or ranges on the timeline diagram to refine or sub-select a set of data being represented for display.

Figure 11:
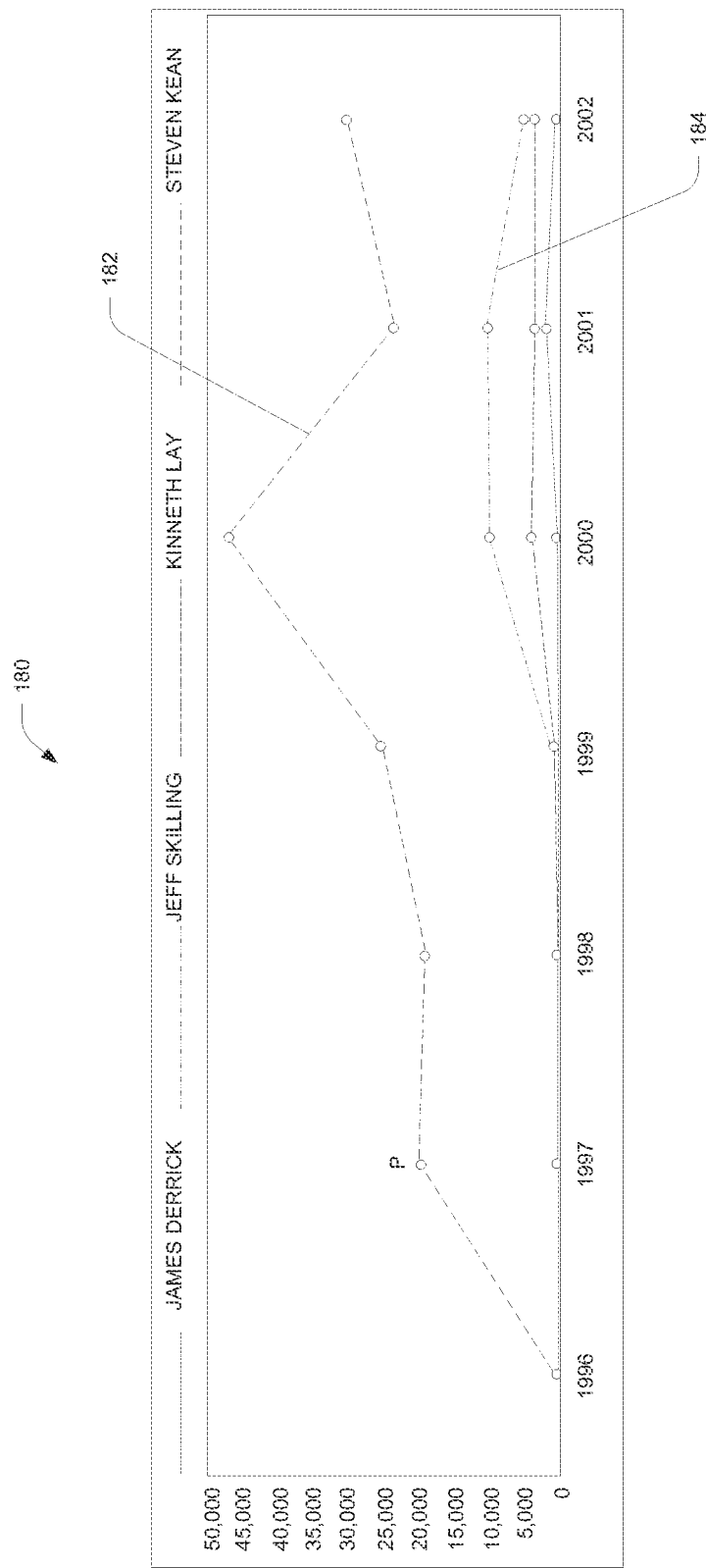
FIG. 11 illustrates an exemplary timeline diagram generated using the interactive case management system of FIG. 1A, according to an embodiment of the present disclosure.

The data anomaly analysis module 50 may be configured to use the generated timeline diagrams for assessing time-based anomalies in data for the e-discovery investigations. For this, the data anomaly analysis module 50 may identify various aspects (e.g., file types, hash values, file systems, etc.) associated with the filtered files and related data corresponding to one or more specified custodians. A date associated with each of the identified electronic files may be determined. The data anomaly analysis module 50 may also determine a number of electronic files associated with the specified custodians in each of a series of predefined or dynamically defined time segments (e.g., intervals of one year) over a period of time (e.g., a period of ten years) to display the corresponding timeline diagram. The data anomaly analysis module 50 may be configured to compare the number of electronic files (e.g., email files) between different time segments to identify those time segments with large and/or small numbers of electronic files as compared to a count of electronic files in other time segments for assessing the time-based anomalies in the data. For example, as shown in FIG. 11, a curve 184 may represent a volume of email files over seven years from "1996" to "2002". The data anomaly analysis module 50 may determine the volume of email files at regular time segments or intervals of one year over time period of seven years. The data anomaly analysis module 50 may be configured to display the curve 184 and related time segments '1996 to 1997' and '1997 to 1998', where the numbers or volume of emails files are relatively less than the same in other time segments for the custodian "Jeff Skilling". The data anomaly analysis module 50 may be further configured to determine whether the actual number of files and related data (or critical data) are missing or have not be considered for ESI investigation based on a predetermined threshold value. The data anomaly analysis module 50 may generate an indication (e.g., a pop-up alert message, a beep, mouse vibration, etc.) to a user about the critical data being missed in one or more time segments such as in time segments '1996 to 1997' and '1997 to 1998', when the data in these time segments may be less than 10% of the total data retrieved by the platform connection module 32 from the third-party data repository 20. In some embodiments, the threshold value may be defined on-the-fly based on a variety of parameters known in the art, related art, or developed later, by the user.

Additionally or alternatively, the data anomaly analysis module 50 may identify deleted or missed electronic files and/or electronic files from at least one of the third-party data repository 20 and the database 28 for analyses, based on one or more predefined or dynamically defined threshold values. In some other embodiments, the data anomaly analysis module 50 may define the number of electronic files in each of the series of time segments for a group of custodians collectively. In further embodiments, the electronic files may represent e-mail files or electronic documents. Other embodiments may include the electronic files having e-mail files corresponding to e-mails sent to the custodians or those corresponding to e-mails sent from the custodians.

Deduplication Module

The DeDuplication module 54 may be configured to represent the files and related data, which are filtered by the filter module 40, in one or more predetermined schemes known in the art, related art, or developed later. Each scheme may provide counts of duplicate and non-duplicate data records based on the metadata associated with the files.

In one example, the DeDuplication module 54 may represent the files and related data in a Global DeDuplication scheme. According to this scheme, the DeDuplication module 54 may generate one or more reports indicating a number of duplicate and non-duplicate records for an entire case or a customizable group of cases. The data represented in the Global DeDuplication scheme may indicate a set number of records that may be exported to an e-discovery reviewing application.

In another example, the DeDuplication module 54 may represent the files and related data in a Custodian DeDuplication scheme. According to this scheme, the DeDuplication module 54 may generate one or more reports indicating a number of duplicate and non-duplicate records for each custodian or a customizable group of custodians. The data represented in the Custodian DeDuplication scheme may indicate that at least one copy of each duplicate record may be exported for each custodian, or the customizable group of custodians, to an e-discovery application, such as an e-discovery reviewing application.

Decision Module

The decision module 44 may be configured to apply another filter facet referred to as file scope, which may indicate whether or not the files and related data received from the AV module 42 or the filter module 40 are relevant to the investigation. In one embodiment, the file scope may be represented as various labels, which may be preset based on the metadata associated with the files, or selected explicitly from dynamically defined labels by a user based on a manual review of the files and related data. In one example, the labels may be named as "Include", "Exclude", or "Undecided" to indicate the status of files for being promoted to one of the stages such as a review stage of the e-discovery investigations. The label "Include" may indicate that the corresponding files are ready to be forwarded to a reviewing application, such as the third-party application 14. The label "Exclude" may refer to files and related data intended not to be promoted forward to an e-discovery reviewing application. The files and related data marked with the "Exclude" label may be considered as irrelevant for the investigation. The label "Undecided" may refer to the default state of files and related data received by the advanced filtering module 36. The files and related data marked with the "Undecided" label may indicate, without limitation, whether these files and related data are yet to be reviewed or need further review until a decision is made to "Include" and "Exclude" them.

In some embodiments, the decision module 44 may provide a "Committed" label in addition to rest of the labels. Once the "Committed" label is selected and/or applied, the status of the files and related data marked with any of the rest of the labels may become unchangeable. For example, when the status of files marked as "Included" is changed to "Committed", the initially selected or marked label "Included" referring to the status of the files may bound them to be promoted to the review application. Similarly, the application of the "Committed" label may irrevocably seal the status of the files being marked as "Excluded" and "Undecided", which may however be subjected to offline analysis or forwarded to the e-discovery review application with the same initial status based on one or more user inputs.

Figure 12:
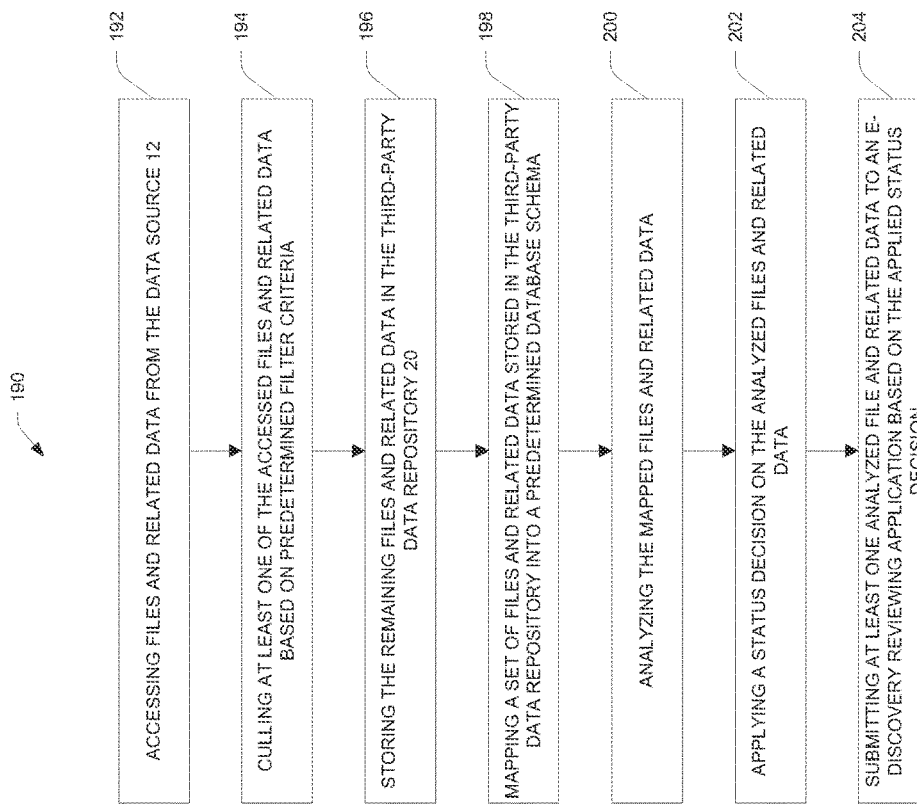
FIG. 12 is a flow chart illustrating an exemplary method for implementing the interactive case management system of FIG. 1A, according to an embodiment of the present disclosure.

FIG. 12 illustrates an exemplary method for implementing the interactive case management system, according to an embodiment of the present disclosure. The exemplary method 190 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 190 is described is not intended to be construed as a limitation, and any number of the described method blocks may be combined or otherwise performed in any order to implement the method 190, or an alternate method. Additionally, individual blocks may be deleted from the method 190 without departing from the spirit and scope of the present disclosure described herein. Furthermore, the method 190 may be implemented in any suitable hardware, software, firmware, or combination thereof, that exists in the related art or that is later developed.

The method 190 describes, without limitation, implementation of the exemplary interactive case management system 16. One of skill in the art will understand that the method 190 may be modified appropriately for implementation in a various manners without departing from the scope and spirit of the disclosure.

At step 192, case management system 16 retrieves electronic files and related data from data source 12. In one embodiment, a user may login into the interactive case management system 16 using predefined login credentials, for e.g., a username and password, or any other access techniques such as those discussed above. The interactive case management system 16 may be configured to manage one or more cases, custodians, and clients, as well as compatible or associated file shares and databases. In one example, a case and associated one or more custodian may be created in the interactive case management system 16. The user may be assigned access rights to perform a variety of operations including, but not limited to, (1) case and custodian information management; (2) assignment and/or publishing of data for the created case from an outside data source such as the data source 12 to the interactive case management system 16; (3) configuring the published data for analyses, reporting, display, and export to one or more compatible systems; (4) user and user role (e.g., case roles, system roles, etc.) information management; and (5) billing management based on various schemes such per case, per custodian, per user access, per role, and so on.

Once the case is created, the user may establish a communication link with the data source 12 and the third party e-discovery application 14 through the data intake module 30. The link may be created using various wired or wireless interfaces and access techniques known in the art, related art, or developed later. For e.g., the data intake module 30 may communicatively connect with the data source 12 and the third-party application 14 via one or more USB cables and login credentials. The data source 12 may store a collection of loose, unprocessed, electronic, computer readable files such as system files, program files, document files, multimedia files, and emails, which may be accessed for the case by the data intake module 30.

At step 194, at least one of the accessed files and related data are culled based on predetermined filter criteria. The data intake module 30 may include various predefined or dynamically defined criteria for filtering the accessed files and related data. Examples of these criteria may include, but are not limited to, one or more file paths, date ranges, file types, and hash values. The data intake module 30 may determine the file information (e.g., filename, file path, system date, etc.) of the accessed files, hash values (e.g., MD5 hash values), reference hash tables such as the reference hash tables 102, and file types (e.g., PDF, PST email database, MOV video, WAV audio, TIFF image, etc.) to implement the filter criteria. The user may select one or more filter criteria to cull at least one of the files and related data, which may not be relevant for the e-discovery request or investigation. The remaining files and related data may be returned as a positive filter result for each of the selected filter criteria.

At step 196, the remaining files and related data are stored in a third-party data repository. The data intake module 30 may access the third-party application 14 and store the files and related data obtained as the positive filter result in the data repository 20. On the other hand, the data intake module 30 may tag the culled files and related data with a label stating "Filtered". The culled files and related data may not be moved or mapped to the predetermined location such as the data repository 20 from the data source 12. In one embodiment, the data intake module 30 may record the filtering information for the positive filter result, or otherwise, in the intake table. The filtering information may include, but not limited to, a list of values inputted for the selected filter criteria, actual files and related data, and so on.

At step 198, a set of files and related data stored in the third-party data repository 20 may be mapped into a predetermined database schema. The third-party data repository 20 may store the files and related data in various known or proprietary formats and schema. In one embodiment, the interactive case management system 16, upon a user request, may map a set of files and related data from the data repository 20 to the database 28.

The user may login into the third-party application 14 through the platform connection module 32 using various access techniques known in the art, related art, or developed later. The platform connection module 32 may determine the file system type and database information including the database table having the metadata of records and the file share location in the data repository 20. The database table of the data repository 20 may be used to determine the location of files and related data.

In one embodiment, the third-party application 14 may authorize the platform connection module 32 to access those files and related data that may be uncorrupted and/or available for being published by the interactive case management system 16. The accessed files and related data may be mapped to a predetermined schema so that the files and related data are usable by the interactive case management system 16.

The platform connection module 32 may parse the accessed data (e.g., body of an email, content of a word file, a file embedded in another file, etc.) and related metadata and map the parsed data into various tables in the predetermined schema implemented by the database 28.

For example, the data repository 20 may store the data in a table having fields "Author_Name" and "Email_Subject". However, a table of the predetermined schema may have fields "Author" and "Subject". In one embodiment, the platform connection module 32 may be configured to read the files and map the related data from the "Author_Name" and the "Email_Subject" fields to the respective "Author" and the "Subject" fields of the predefined schema of database 28.

In some embodiments, the platform connection module 32 may reverse map a predetermined information associated with the mapped files and related data from the predefined schema of database 28 to the data repository 20. Such reverse-mapped information (e.g., custodian ID, media ID, data source ID, work package ID, etc.) may be tagged to facilitate tracking of the tagged files and data, which is mapped in the predefined schema of database 28, in the data repository 20. The mapped files and related data may be stored in the database 28 so as to be used for analyses, reporting, display, and export to one or more compatible systems or applications.

Figure 13:
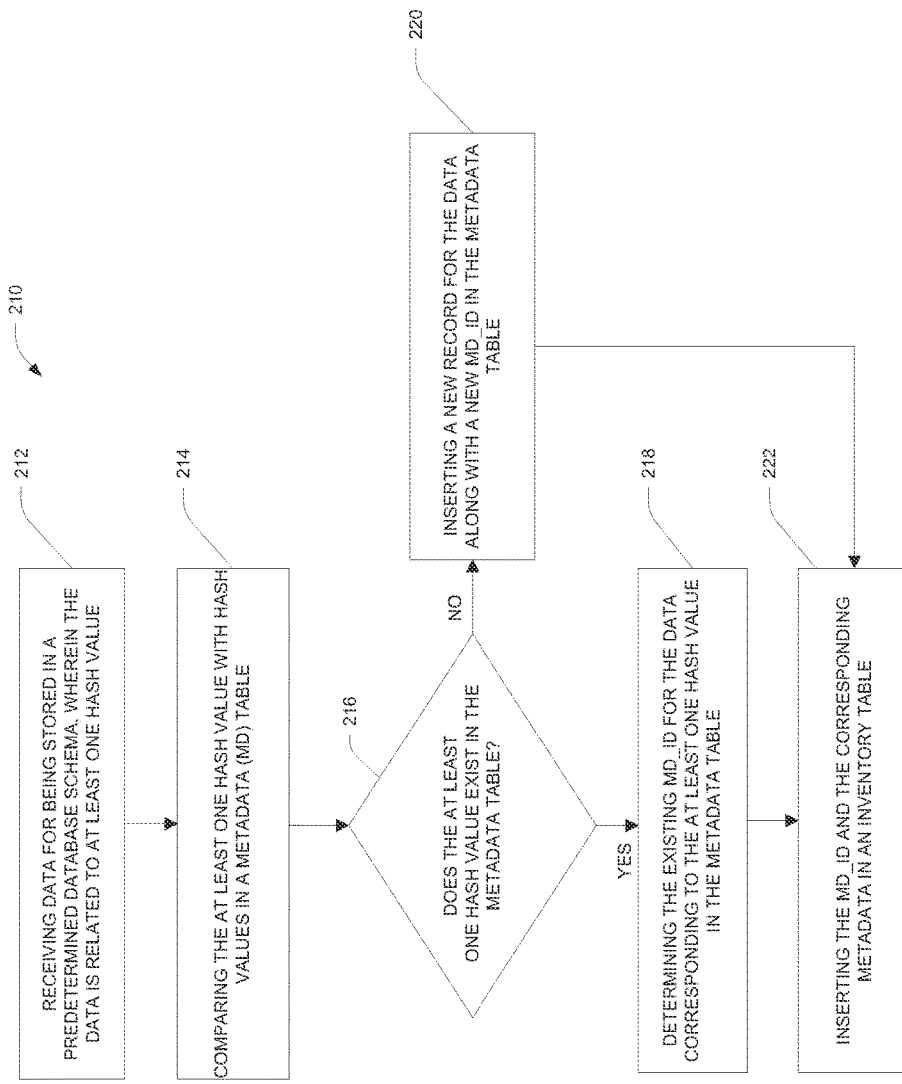
FIG. 13 is a flow chart illustrating an exemplary method for storing metadata implemented the interactive case management system of FIG. 1A, according to an embodiment of the present disclosure.

Exemplary steps for storing the mapped data in the database 28 are illustrated in FIG. 13. At step 212, data for being stored in the predetermined database schema are received. The platform connection module 32 may create a metadata table, such as metadata table 230 (FIG. 14), and an extracted text table, such as extracted text table 232, for the data mapped in the predetermined schema. The metadata table 230 may store metadata (e.g., filename, data size, hash value, email subject, etc.) associated with the mapped data and the extracted text table 232 may store the extracted text such as body of an email, contents of a word file, etc. from the files corresponding to the mapped data.

The mapped data may be associated with one or more hash values of a predetermined hashing algorithm. For example, the mapped data may be associated with one or more MD5 hash values. The platform connection module 32 may be configured to determine at least one hash value associated with the mapped data. In some embodiments, these hash values may be calculated by the platform connection module 32 or the data intake module 30 for the mapped files. In other embodiments, the hash values corresponding to the mapped data may be determined from the intake table created by the data intake module 30 at the time of ingesting the original data and the corresponding files from the data source 12 to the data repository 20.

At step 214, the at least one hash value is compared with the hash values in the metadata table 230. In one embodiment, the platform connection module 32 may compare at least one MD5 hash value related to the mapped data with the hash values in the metadata table 230. At step 216, the platform connection module 32 may check if the at least one hash value such as MD5 hash value exists in the metadata table 230.

At step 218, if the platform connection module 32 determines that the at least one hash value already exists in the metadata table 230, the platform connection module 32 may be configured to determine the metadata (MD) identity number "MD_ID" corresponding to the at least one hash value existing in the metadata table 230.

At step 220, if the platform connection module 32 determines that the at least one hash value does not exist in the metadata table 230, the platform connection module 32 may be configured to insert a new record for the metadata associated with the mapped data and assign a new MD_ID to this new record in the metadata table 230.

At step 222, the platform connection module 32 may be configured to map the MD_ID from steps 218 and 220, and the corresponding metadata from the metadata table 230 to an inventory table 234. In some embodiments, the platform connection module 32 may refer to the extracted text in the extracted text table 232 using the MD ID and may additionally copy the extracted text to the inventory table 234. In FIG. 14, two records having inventory ID "1" and "3" in the inventory table 234 have the same metadata IDs, i.e., "1" indicating that both the records refer to the same metadata in the metadata table 230 and the extracted text table 232. Therefore, a single copy of the metadata and the extracted text may be maintained and stored in the database 28. Such single instance storage of the metadata and the extracted text improves data access efficiencies by saving storage space as well as reduces data insert time in the database tables, particularly for those which hold larger amounts of data on average per record. Various modules of the interactive case management table 16 may use the inventory table 234 for data analyses, reporting, display, or export to the other systems or applications.

In some embodiments, publishing of accessed files and related data implemented by mapping of the parsed data into one or more tables in the predetermined schema of the database 28, may be unpublished by the platform connection module 32. Upon being unpublished, the mapped files and related data may be removed from at least one of the database 28 and the data repository 20. In some other embodiments, the platform connection module 32 may be configured not to unpublish the mapped and/or stored files and related data if any of the files or related data is already associated with at least one the status decisions including "Included", "Excluded", "Committed", or the like, by a user.

In further embodiments, the platform connection module 32 may be configured to index the mapped files and related data using a variety of types of indexes known in the art, related art, or developed later. In one embodiment, the platform connection module 32 may create the full-text index to support full-text searching of various data records stored in the database 28.

The processor 22 module may receive from a user one or more search terms or metadata element for being searched in the database tables. The search terms may be used for searching the data records using various tools, techniques, and syntaxes known in the art, related art, or developed later including "dtSearch" searching technology to implement full-text searching. The search terms may be stored as metadata for the corresponding case in the metadata table such as the metadata table 230 in the database 28.

Based on the search, the processor 22 may generate search reports including various predetermined fields and columns. In one embodiment, the generated search reports may include at least one column that provides a measure of impact for each search term. For example, the search report may provide the total number of files (and corresponding size such as in gigabytes), which are exclusive hits by each of the search terms as compared to other terms in a search query.

Figure 15:
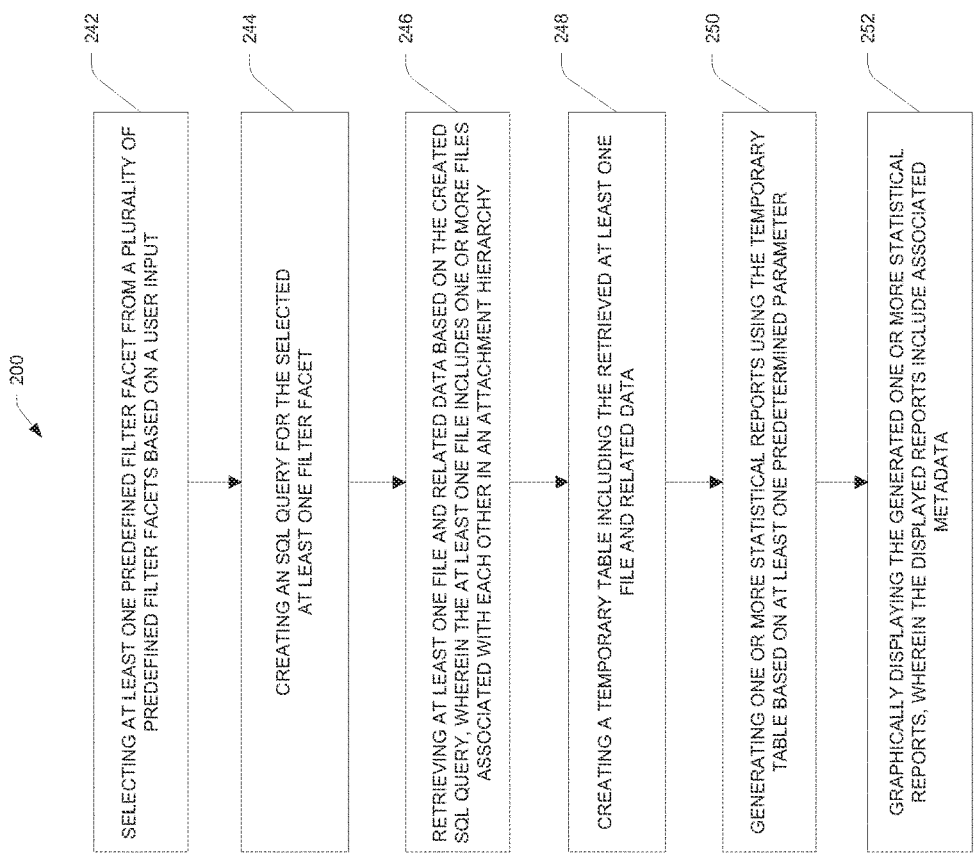
FIG. 15 is a flow chart illustrating an exemplary method for filtering of data implemented by the interactive case management system of FIG. 1A, according to an embodiment of the present disclosure.

At step 200 (FIG. 12), the mapped files and related data are analyzed. The mapped files and related data may be analyzed by the advanced filtering module 36 based on a user input. One exemplary method implemented by the advanced filtering module 36 is discussed in FIG. 15.

As shown, at step 242, at least one predefined filter facet and a value or a range of values for that facet may be selected from a plurality of predefined filter facets based on a user input. The filter module 40 may include a variety of filter facets predefined based on the metadata corresponding to the mapped files. Examples of these facets may include, but are not limited to, custodians, dates, email domains, file-types, and keywords. In some embodiments, the filter module 40 may allow a user to on-the-fly, i.e., dynamically, define these filter facets. Among the defined filter facets, the user may select at least one filter facet for filtering the mapped files and related data.

At step 244, an SQL query may be created for the selected at least one filter facet. The filter module 40 may employ various tools, techniques, and protocols in any computer language to communicate with the database 28. In one embodiment, the filter module 40 may convert a filter facet selection by a user into an SQL query for communicating with the database 28.

At step 246, at least one file and related data may be retrieved based on the created SQL query. The filter module 40 may apply the created SQL query to search for the corresponding data records in various tables of the database 28. In one embodiment, the complete family of records may be included within the scope of SQL query for searching the relevant data records in the database 28. The family of records may refer to multiple files associated with each other in an attachment hierarchy. For example, the SQL query may correspond to a 'file type' filter facet such as email items. The query may return a filter result including at least one email file, which may be associated with another file such as a word file or a GIF file being an attachment of the email file. The at least one email file and its attachments may be retrieved by the filter module 40.

At step 248, a temporary table including the retrieved at least one file and related data is created. In one embodiment, the filter module 40 may create a temporary table, for storing the filter result. The filter result may include the retrieved files and related data, and the corresponding selected filter facet. The temporary table may be stored in the database 28 by the filter module 40.

At step 250, one or more statistical reports may be generated using the temporary table based on at least one predetermined parameter. In one embodiment, various modules, such as the ECA module 48, in the advanced filtering module 36 may use the temporary table for generating statistical reports. The reports may be generated based on various predetermined parameters based on the metadata associated with the retrieved files in the temporary table. Examples of these parameters may include, but are not limited to, document type (e.g., indicating count of email files versus other electronic files), direct search hits based on the filter facets, indirect search based on the filter facets, and so on. Direct search hits may refer to the documents that meet the exact search criteria specified by the selected filter facet. The indirect search hits may refer to additional family documents (e.g., email attachments, etc.) associated with a document that meets the exact search criteria specified by the selected filter facet.

Figure 16:
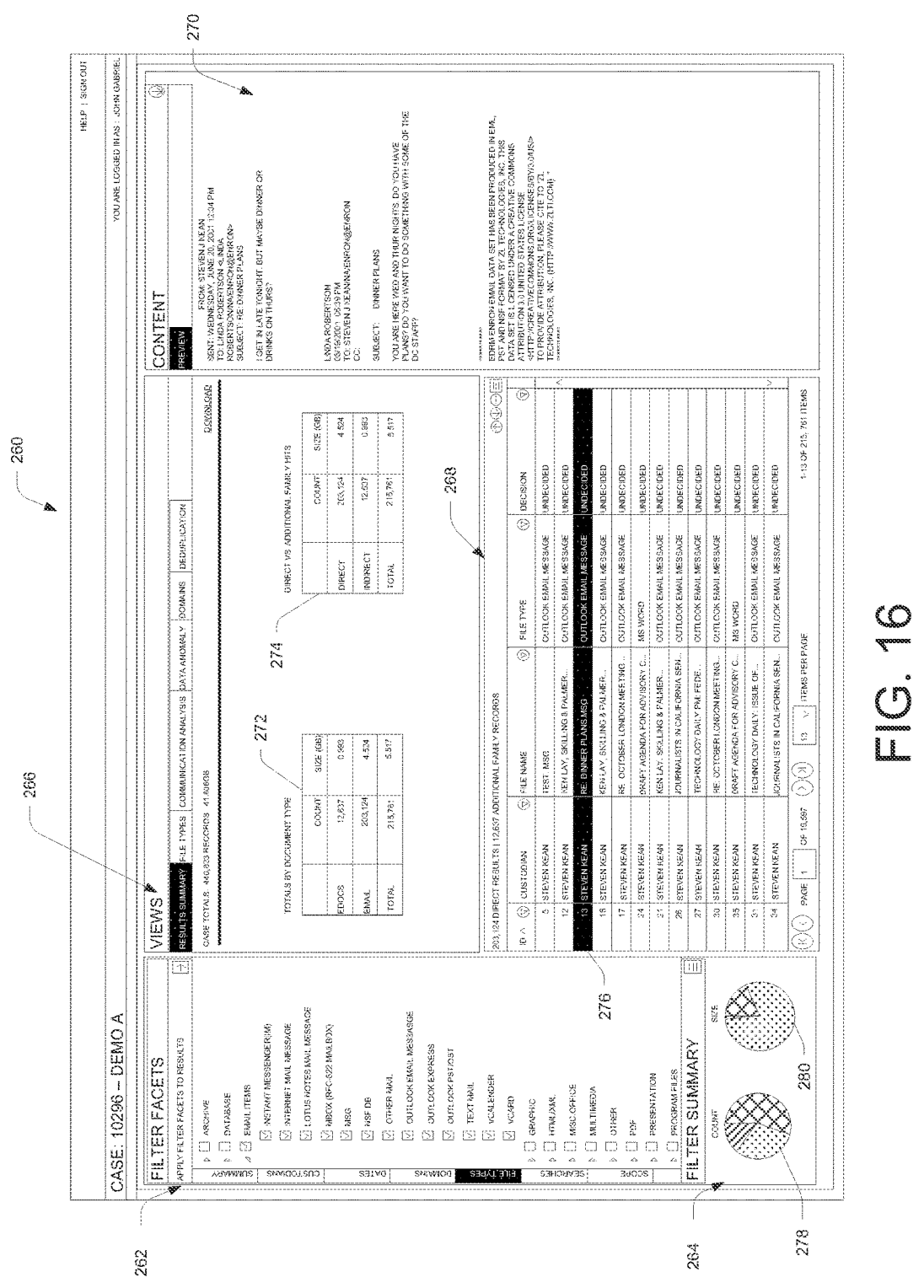

At step 252, the generated one or more statistical reports are displayed graphically to a user. Various modules associated with the advanced filtering module 36 may display the generated statistical reports graphically on a display device. The example of FIG. 16 shows an exemplary interface screen 260 of the interactive case management system 16. The interface screen 260 may include a filter facet section 262, a filter summary section 264, a views section 266, a results section 268, and a content section 270, each of which may be resizable, collapsible, or capable of being dragged over each other.

The filter facet section 262 may display various predefined or dynamically defined filter facets for being selected by the user. The filter summary section 264 may display current statistics for voting decisions on the filtered files and related data. The views section 266 may show statistics and visualizations about the files and related data obtained as filter results upon application of the selected filter facets. The results section 268 may display the metadata for the files obtained as filter results upon application of the selected filter facets. The content section 270 may display the extracted text from a file corresponding to metadata selected in the results section. In some embodiments, the content section 270 may also provide an option to download the original file stored in the database 28.

In a first embodiment (FIG. 16), the filter module 40 may display the statistical reports graphically in the views section 266. In one example, the filter module 40 may display the statistical reports in a table 272 based on document type. As shown, the table 272 may include columns "Count" and "Size (GB)" for each of the file types selected by way of the filter facets in the filter facet section 262. The "Count" may refer to the total number of files of a particular file type, and "Size (GB)" may refer to the size of the total number of files of that file type. In another example, the filter module 40 may display the statistical reports graphically in a table 274 base on direct and indirect search hits. As shown, the table 274 may include columns "Count" and "Size (GB)" for each of the direct search hits represents as "Direct" and indirect search hits represented as "Indirect". In some embodiments, the graphically displayed statistical reports may be associated with one or more predefined or dynamically defined widgets.

The results section 268 may display the metadata for the direct search hits. The metadata may include multiple files and related data including file ID represented under the column "ID", associated custodian represented under the column "File Name", file type represented under the column "File Type", and current decision status represented under the column "Decision" indicating whether the corresponding file and related data are relevant for the e-discovery investigation and may be submitted to an e-discovery application such as the third-party application 14 or any other e-discovery application. Each of such column headers (e.g., "ID", "File Name", "File Type", "Decision", etc.) may be configured to sort the respective underlying data in numeric or alphanumeric order. For example, the column header "ID" may be clicked to sort the underlying IDs in ascending or descending order. Additionally or alternatively, one or more columns may be temporarily added or removed. In some embodiments, the results section 268 may be configured to receive one or more inputs such as text for filtering the metadata displayed in one or more columns.

Upon selecting a metadata record in the results section 268, the corresponding data or extracted text may be displayed in the content section 270. For example, when a metadata record 276 is selected, the extracted text or content from a corresponding file may be displayed in the content section 270.

Figure 17:
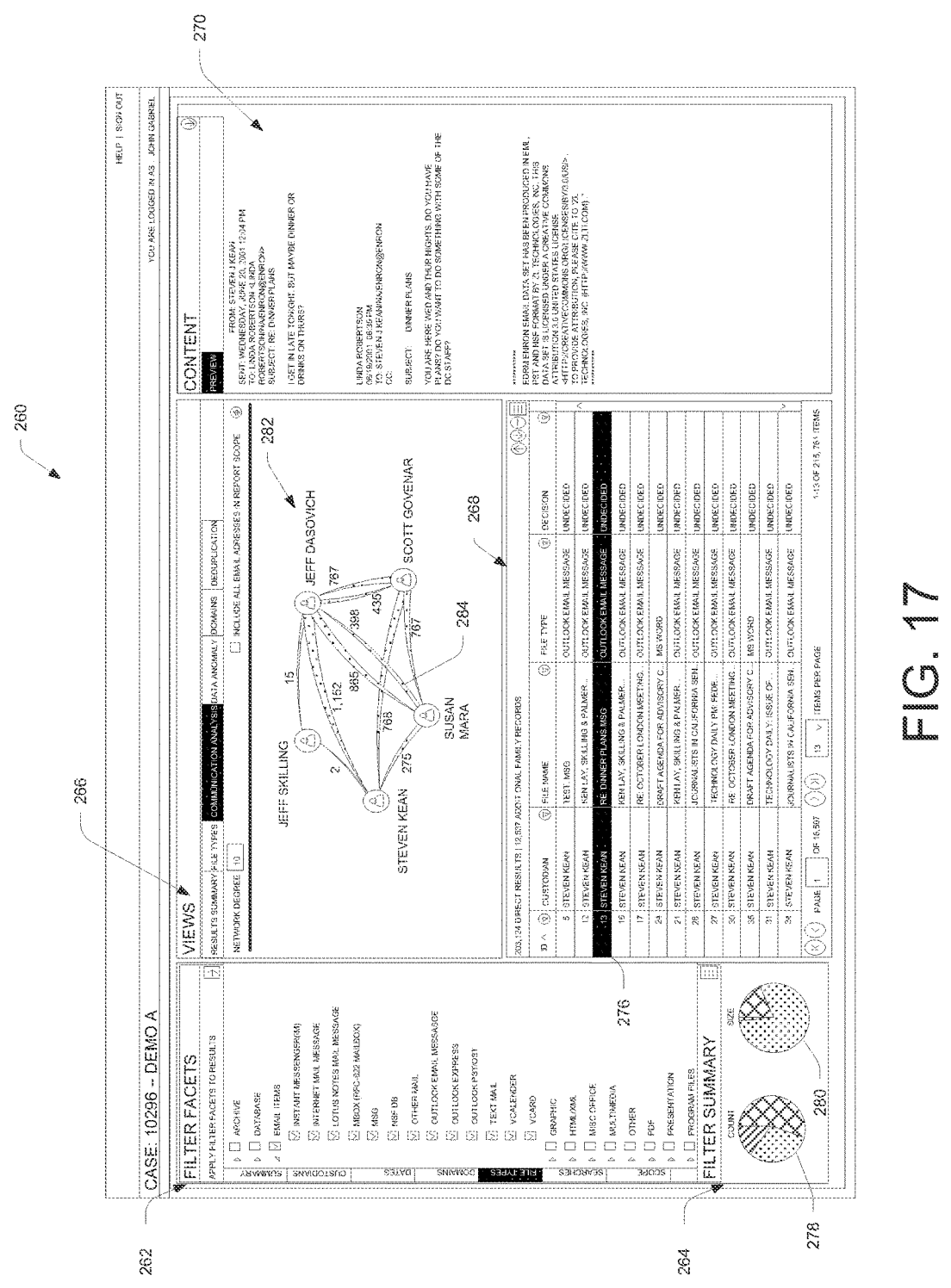

The filter summary section 264 may display the current statistics of the files and related data displayed in the results section 268. For example, the filter summary section 264 may display the count of files and related data as a pie chart 278 and the corresponding total size of the files and related data may be displayed as a pie chart 280. The pie charts 278, 280 may be color coded to represent the corresponding count and size of files based on the status decision such as "Include", "Exclude", or "Undecided", of the files. In one instance, the files having the status decision as "Include" may be represented by green color, the files having the status decision as "Exclude" may be represented by red color, and the files having the status decision as "Undecided" may be represented by grey color In a second embodiment (FIG. 17), the ECA module 48 may display communications (e.g., email communications, SMS messages, etc.) between two or more communicating parties graphically in the views section 266 of the interface screen 260. In one example, the ECA module 48 may display an email communication diagram 282 having each email party being represented as a node; and two or more nodes being connected using lines representative of the email communication between each pair of the nodes. Each line may refer to one or more files and related data communicated between the corresponding nodes. These files and related metadata corresponding to the line, upon being selected, may be displayed in the results section 268. For example, the user may click on the line 284 to display the corresponding files and related metadata in the results section 268. In some embodiments, the email communication diagrams may be associated with one or more predefined or dynamically defined widgets.

Similar to the first embodiment, a metadata record in the results section 268 may be selected to display the corresponding data or extracted text in the content section 270. For example, the metadata record 276 may be selected to display the corresponding extracted text or content in the content section 270. Further, the filter summary section 264 may display the count of files and related corresponding to the selected line 284 as the color-coded pie chart 278 and the corresponding total size of the files and related data may be displayed as the color-coded pie chart 280. Other embodiments may include display of timeline diagrams, such as the timeline diagram 180, for assessing time-based anomalies in data by determining deleted or missed files and related data based on one or more predefined or dynamically defined threshold values.

Further to the method 190 implemented by the interactive case management system 16, at step 202 (FIG. 12), a status decision may be applied on the analyzed files and related data. The analyzed files may be subjected to the decision module 44 configured to apply a status decision indicating if the files are relevant for the e-discovery investigations. In one embodiment, the decision module 44 may allow a user to select at least one of the labels, namely, "Include", "Exclude", "Undecided", and "Committed" to indicate a file status decision.

"Include" label may indicate that the corresponding files are relevant for e-discovery investigations and may be forwarded to the e-discovery reviewing application. The label "Exclude" may refer that the files and related data are not relevant for the e-discovery investigations and may not be forwarded to the e-discovery reviewing application. The label "Undecided" may refer to the default state of files and related data received by the decision module 44. The "Undecided" label may indicate, without limitation, that the corresponding files and related data are either yet to be reviewed or need further review until a decision is made to "Include" and "Exclude" them.

The "Committed" label may indicate that the status of the corresponding files and related data have been finalized. In one example, the status of a file marked with the "Include" label may be considered as final if the label is changed to "Committed" by the user. Hence, the status of the file cannot be changed any further after the "Committed" label is selected by the user.

At step 204, at least one analyzed file and related data is submitted to an e-discovery application based on the applied status decision. The advanced filtering module 36 may be configured to submit or hold back the analyzed files and related data to the e-discovery application such as the third-party application 14 or any other application based on the file status decision selected by the user. For example, if the user selects the status of an analyzed file as "Include", and then "Committed", the analyzed file may be considered as being relevant for the e-discovery investigations and hence, may be forwarded or submitted to the e-discovery application, such as an e-discovery reviewing application. In some embodiments, the analyzed files may be subjected to de-duplication by the DeDuplication module 54 after being applied with the "Committed" label for further reducing the volume of data to be promoted to the e-discovery reviewing application. The relevant volume of data corresponding to the analyzed files may be displayed by the DeDuplication module 54 as a high-level snapshot by running a filter for all files and related data labeled as "Included" only.

In case, the status of the file is selected to be "Exclude", "Undecided", or not selected to be "Committed", the corresponding file may be held back with the interactive case management system 16 in the database 28 by the advanced filtering module 36. Alternatively, the status of the electronic file in data repository 20 may be updated with any change in status by the decision module 44.

Exemplary embodiments are intended to cover all software or computer programs capable of performing the various heretofore-disclosed determinations, calculations, etc., for the disclosed purposes. For example, exemplary embodiments are intended to cover all software or computer programs capable of enabling processors to implement the disclosed processes. In other words, exemplary embodiments are intended to cover all systems and processes that configure a computing device to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs may be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs may be written in exemplary programming languages that execute from memory on the computing device or from a hosted server, such as BASIC, COBOL, C, C++, Java, Pascal, or scripting languages such as JavaScript, Python, Ruby, PHP, Perl or other sufficient programming languages.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method of assessing time-based anomalies in data represented by electronic computer readable files in a computer system including at least one processor and at least one electronic storage device coupled to the at least one processor comprising:
   the at least one processor identifying all electronic files stored in the at least one electronic storage device obtained from one or more specified custodians of electronic files;
   the at least one processor determining a date associated with each of the identified electronic files;
   the at least one processor determining a number of electronic files associated with the specified custodians in each of a series of same-sized time segments over a period of time;
   the at least one processor detecting at least one data anomaly within the number of electronic files, the detecting comprising comparing a number of files present in at least one of the time segments to numbers of files present in other time segments and identifying, from the comparing, at least one of a time segment having a largest number of electronic files compared to other time segments and/or a time segment having a smallest number of electronic files compared to the other time segments as indicating the at least one data anomaly;
   the at least one processor causing at least one display coupled to the at least one processor to display the number of electronic files in each of the series of time segments; and
   the at least one processor causing the at least one display to report the at least one data anomaly, the reporting comprising illustrating the identified at least one time segment and illustrating at least one of the other time segments, thereby reporting the at least one data anomaly at least in part by a visual comparison of the time segments.

2. The method of claim 1 further comprising identifying deleted electronic files and/or electronic files missed in collecting the electronic files.

3. The method of claim 1 wherein the at least one processor defines the number of electronic files in each of the series of time segments for a group of custodians collectively.

4. The method of claim 1 wherein the electronic files represent e-mail files.

5. The method of claim 1 wherein the electronic files represent electronic documents.

6. The method of claim 1 wherein the electronic files include e-mail files corresponding to e-mails sent to the custodians or e-mail files corresponding to e-mails sent from the custodians.

7. The method of claim 1 wherein:
   the at least one processor receives a collection of unprocessed, electronic, computer readable files and stores the electronic files in the at least one storage device;
   the at least one processor retrieves each electronic file from the at least one storage device and determines file system information from the file, the at least one processor storing the file system information in the at least one storage device in association with the file;
   the at least one processor determines a hash value of each electronic file;
   the at least one processor receives at least one search criterion including one or more of file system date range, file type, file path, or whether the hash value can be found in a list of hash values for electronic files known to be irrelevant to the investigation;
   the at least one processor compares each electronic file and/or the associated file system information to the received at least one search criterion to determine the files that meet the at least one search criterion as a positive result;
   the at least one processor, when the hash value is selected as the at least one search criterion, determines whether the hash value is not on the list of hash values as a positive result; and
   the at least one processor provides the electronic files with positive results to an e-discovery application provided on the computer system and populates an electronic file with identifying information concerning those electronic files not resulting in a positive result.

8. The method of claim 7 wherein:
   the at least one processor stores in the at least one storage device all hash values with predetermined digits in common with other hash values in the list of hash values in tables, wherein the number of predetermined digits is between one and less than all of the digits in the hash values;
   the at least one processor receives the hash value of each electronic file;
   the at least one processor identifies the table including the hash values having the predetermined digits in common with the received hash value;
   at least one processor searches for the received hash value in the identified table stored in the at least one electronic storage device;
   the at least one processor determines a positive result when the received hash value is not in the identified table; and
   the at least one processor not indicates a positive result when the at least one processor determines that the received hash value is in the identified table.

9. The method of claim 1 wherein:
   the at least one processor receives the computer readable electronic files and data related to the electronic files from a third-party e-discovery processing application being executed by the computer system;
   the at least one processor maps the electronic files and related data into electronic files and related data usable by a reporting and filtering application being executed on the computer system;
   the at least one processor stores the useable electronic files in the at least one electronic storage device; and
   the at least one processor accesses the useable electronic files in the at least one electronic storage device for use by the reporting and filing application.

10. The method of claim 1 wherein:
    the at least one processor stores computer readable electronic files of the communications in the at least one electronic storage device;
    the at least one processor maps a plurality of communication addresses associated with a plurality of communicators to a single communication party; and
    the at least one processor reports or graphically displays on the at least one display the communications wherein all communications involving the plurality of communication addresses are treated as involving the single communication party.

11. The method of claim 1 wherein:
    the at least one processor stores the computer readable electronic files and associated data corresponding to communications associated with the investigation from a group of custodians in the at least one storage device;

the at least one processor identifies source and destination address data included in the electronic files and associated data for the communications;

the at least one processor uses the electronic files and related data to determine the number and direction of the communications among the source and destination addresses;

the at least one processor graphically represents communications by establishing a node for each of the source and destination addresses and extending lines between the nodes to represent a number and direction of communications between addresses associated with the nodes; and the at least one processor indicates on the graphical representation custodians not included in the group of custodians from whom electronic files and associated data should be considered in the investigation.

12. The method of claim 1 wherein:

the at least one processor receives at least one facet for the basis of selecting electronic files and at least one value associated with each facet, the at least one facet including custodians of the electronic files, dates associated with the electronic files, e-mail domains associated with e-mails represented by the electronic files, file types of the electronic files, terms included within the electronic files, or current states of the electronic files or any combination thereof;

the at least one processor filters for computer readable electronic files stored in the at least one electronic storage device meeting the at least one value associated with the at least one facet received by the at least one processor;

the at least one processor displays on the at least one display metadata associated with the electronic files identified in the filters;

the at least one processor causes contents of an electronic file selected based on the metadata to be displayed on the at least one display; and the at least processor records an indication from a user as to whether or not an electronic file is responsive to an investigation.

13. The method of claim 1 wherein:

the at least one processor receives a plurality of search terms and/or electronic file metadata elements to be searched;

the at least one processor conducts a search in the electronic files for each search term and/or metadata element;

the at least one processor determines a number of electronic files including each search term and/or metadata element and a number of electronic files including each search term and/or metadata element and no other of the search terms or metadata elements; and the at least one processor causes the numbers to be displayed on the at least one display.

14. The method of claim 1 further comprising for each new electronic file to be added to a collection of computer readable electronic files stored in the at least one storage device:

the at least one processor determining a hash value of the new electronic record;

the at least one processor determining whether the hash value of the new electronic file matches a hash value of an electronic file already in the collection;

when the hash value of the new electronic file does not match the hash value of any electronic file already in the collection, the at least one processor adding the new electronic file and its hash value to the collection stored in the at least one storage device; and when the hash value of the new electronic file matches the hash value of an electronic file already in the collection, the at least one processor linking an identity of the new electronic file to the electronic file already in the collection with the matching hash value without storing the new electronic file in the collection.

15. A computer system for assessing time-based anomalies in data represented by electronic, computer readable files comprising:

at least one processor:

at least one electronic storage devices coupled to the at least one processor:

at least one display coupled to the at least one processor, wherein:

the at least one processor identifies all electronic files stored in the at least one storage device obtained from one or more specified custodians of electronic files;

the at least one processor determines a date associated with each of the identified electronic files;

the at least one processor determines a number of electronic files associated with the specified custodians in each of a series of same-sized time segments over a period of time;

the at least one processor detects at least one data anomaly within the number of electronic files, the detecting comprising comparing a number of files present in at least one of the time segments to numbers of files present in other time segments and identifying, from the comparing, at least one of a time segment having a largest number of electronic files compared to other time segments and/or a time segment having a smallest number of electronic files compared to the other time segments as indicating the at least one data anomaly;

the at least one processor causes the at least one display to display the number of electronic files in each of the series of time segments; and the at least one processor causes the at least one display to report the at least one data anomaly, the reporting comprising illustrating the identified at least one time segment and illustrating at least one of the other time segments, thereby reporting the at least one data anomaly at least in part by a visual comparison of the time segments.

16. The computer system of claim 15 wherein the at least one display illustrates deleted electronic files and/or electronic files missing in collecting the electronic files.

17. The computer system of claim 15 wherein the at least one processor determines the number of electronic files in each of the series of segments for a group of custodians collectively.

18. The computer system of claim 15 wherein the electronic files include e-mail files.

19. The computer system of claim 15 wherein the electronic files include electronic documents.

20. The computer system of claim 15 wherein the electronic files include e-mail files corresponding to e-mails sent to the custodians or e-mail files sent from the custodians.

21. The computer system of claim 15 wherein:

the at least one processor receives a collection of unprocessed, electronic, computer readable files and stores the electronic files in the at least storage device, the at least one processor retrieves each electronic file from the at least one storage device and determines file system information from the file, the at least one processor storing the file system information in the at least one storage device in association with the file, the at least one processor determines a hash value of each electronic file, the at least one processor receives at least one search criterion including one or more of file system date range, file type, file path, or whether the hash value can be found in a list of hash values for electronic files known to be irrelevant to the investigation, the at least one processor compares each electronic file and/or the associated file system information to the received at least one search criterion to determine the files that meet the at least one search criterion as a positive result, the at least one processor, when the hash value is selected as at least one of the search criterion, determines whether the hash value is not on the list of hash values as a positive result, and the at least one processor provides the electronic files with positive results to an e-discovery application provided on the computer system and populates an electronic file with identifying information concerning those electronic files not resulting in a positive result.

22. The computer system of claim 21 wherein:

the at least one processor receives the list of values for electronic files known to be irrelevant to the investigation;

the at least one processor stores in at least one electronic storage device all hash values with predetermined digits in common with other hash values in the list of hash values in tables, wherein the number of predetermined digits is between one and less than all of the digits in the hash values;

the at least one processor receives a hash value of an electronic file;

the at least one processor identifies the table including the hash values having the predetermined digits in common with the received hash values;

the at least one processor searches for the received hash value in the identified table stored in the at least one electronic storage device;

the at least one processor determines a positive result when the received hash value is not in the identified table; and the at least one processor does not indicate a positive result when the at least one processor determines that the received hash value is in the identified table.

23. The computer system of claim 15 wherein:

the at least one processor receives the computer readable electronic files and data relating to the electronic files from a third-party e-discovery processing application being executed by the computer system;

the at least one processor maps the electronic files and related data into electronic files and related data usable by a reporting and filtering application being executed on the computer system;

the at least one processor stores usable electronic files in the at least one electronic storage device; and the at least one processor accesses the usable electronic files in the at least one electronic storage device used by the reporting and filing application.

24. The computer system of claim 15 wherein:

the at least one processor stores computer readable electronic files of the communications in the at least one electronic storage device;

the at least one processor maps a plurality of communication addresses associated with a plurality of communicators to a single communication party; and the at least one processor reports or graphically displays the communications on the at least one display wherein all communications involving the plurality of communication addresses are treated as involving the single communication party.

25. The computer system of claim 15 wherein:

the at least one processor stores computer readable electronic files and associated data corresponding to communications associated with the investigation from a group of custodians in the at least one storage device;

the at least one processor identifies source and destination address data included in the electronic files and associated data for the communications;

the at least one processor uses the electronic files and related data to determine the number and direction of the communications among the source and destination addresses;

the at least one processor graphically represents communications on the display by establishing a node for each of the source and destination addresses and extends lines between the nodes to represent a number and direction of communications between the addresses associated with the nodes; and the at least one display displays the graphical representation to identify custodians not included in the group of custodians from whom electronic files and associated data.

26. The computer system of claim 15 wherein:

the at least one processor receives at least one facet for the basis of the selecting and at least one value associated with each facet, the at least one facet including domains of the electronic files, dates associated with the electronic files, e-mail domains associated with e-mails represented by the electronic files, file types of the electronic files, terms included within the electronic files, or current states of the electronic files, or any combination thereof:

the at least one processor filters for computer readable electronic files stored in the at least one storage device meeting the at least one value associated with the at least one facet received by the at least one processor;

the at least one processor displays on the at least one display metadata associated with the electronic files identified in the filtering;

the at least one processor causes contents of an electronic file selected based on the metadata to be displayed on the at least one display; and the at least one processor records an indication from a user as to whether or not an electronic file is responsive to an investigation.

27. The computer system of claim 15 wherein:

the at least one processor receives a plurality of search terms and/or electronic file metadata elements to be searched;

the at least one processor conducts a search in the electronic files stored in the at least one storage device for each search term and/or metadata element;

the at least one processor determines a number of electronic files including each search term and/or metadata element and a number of electronic files including each search term and/or metadata element and no other of the search terms or metadata elements; and the at least one processor causes the numbers to be displayed on the at least one display.

28. The computer system of claim 15 wherein:

the at least one processor determines a hash value of each new electronic record to be added to the collection;

the at least one processor determines whether the hash value of the new electronic file matches a hash value of an electronic file already in the collection;

when the hash value of the new electronic file does not match the hash value of any electronic file already in the collection, the at least one processor adds the new electronic file and its hash value to the collection stored in the at least one electronic storage device; and when the hash value of the new electronic file matches the hash value of an electronic file already in the collection, the at least one processor links an identify of the new electronic file to the electronic file already in the collection with the matching hash value without storing the new electronic file in the collection.

\* \* \* \* \*